(12) United States Patent
Power et al.

(10) Patent No.: US 8,792,425 B2
(45) Date of Patent: Jul. 29, 2014

(54) COMMUNICATION SYSTEMS

(75) Inventors: Kevin Power, West Drayton (GB); Michael John Beems Hart, London (GB); Yuefeng Zhou, Oxshott (GB)

(73) Assignee: Fujitsu Limited, Kawasaki (JP)

( * ) Notice: Subject to any disclaimer, the term of this patent is extended or adjusted under 35 U.S.C. 154(b) by 1049 days.

(21) Appl. No.: 12/139,667

(22) Filed: Jun. 16, 2008

(65) Prior Publication Data

US 2009/0073928 A1 Mar. 19, 2009

(30) Foreign Application Priority Data

Aug. 16, 2007 (GB) .................................. 0716028.6

(51) Int. Cl.
*H04W 4/00* (2009.01)
*H04L 5/00* (2006.01)
*H04L 1/00* (2006.01)
*H04W 72/04* (2009.01)
*H04B 7/26* (2006.01)
*H04W 84/04* (2009.01)
*H04W 16/26* (2009.01)
*H04W 28/24* (2009.01)

(52) U.S. Cl.
CPC ............. *H04W 72/042* (2013.01); *H04L 5/003* (2013.01); *H04L 5/0091* (2013.01); *H04B 7/2606* (2013.01); *H04W 84/047* (2013.01); *H04L 5/006* (2013.01); *H04L 5/0064* (2013.01); *H04L 5/0094* (2013.01); *H04L 1/0028* (2013.01); *H04W 16/26* (2013.01); *H04L 5/0007* (2013.01); *H04W 28/24* (2013.01); *H04L 5/0053* (2013.01)
USPC .......................................................... 370/329

(58) Field of Classification Search
USPC .......................................................... 370/329
See application file for complete search history.

(56) References Cited

U.S. PATENT DOCUMENTS 6,973,062 B1   12/2005   Han
2006/0126553 A1 *  6/2006  Lim et al. ...................... 370/321

(Continued)

FOREIGN PATENT DOCUMENTS

EP   1 206 072   5/2002
EP   1 734 664   12/2006

(Continued)

OTHER PUBLICATIONS

GB Search Report dated Jan. 9, 2008, from the corresponding GB Application.

(Continued)

*Primary Examiner* — Kenny Lin
(74) *Attorney, Agent, or Firm* — Katten Muchin Rosenman LLP

(57) ABSTRACT

A signalling method for use in a multiple-access communication system, the system comprising a first communication apparatus and a plurality of second communication apparatuses, the second communication apparatuses being operable to communicate with the first communication apparatus using respective parts of a shared communication frame and each using an available service level for such communication, the method comprising: assessing service-level requests from the second communication apparatuses to determine if there is a group of the second communication apparatuses that have corresponding service-level requirements; if it is determined that such a group exists, employing a first control scheme for transmission in the shared communication frame of communication control information for the second communication apparatuses of the group; and for any second communication apparatus not part of the group, employing a further control scheme different from said first control scheme for transmission in the shared communication frame of communication control information for that second communication apparatus, wherein the first and further control schemes are configured such that use of the first control scheme for said group of second communication apparatuses enables communication for more such second communication apparatuses to be supported in said shared communication frame than if such a further control scheme were used for said group of second communication apparatuses.

20 Claims, 19 Drawing Sheets

(56) References Cited

U.S. PATENT DOCUMENTS

| | | | |
|---|---|---|---|
| 2007/0070880 A1* | 3/2007 | Cai et al. | 370/208 |
| 2008/0062936 A1* | 3/2008 | He et al. | 370/338 |

FOREIGN PATENT DOCUMENTS

| | | |
|---|---|---|
| EP | 1 801 995 | 6/2007 |
| FR | 2 867 007 | 9/2005 |
| KR | 1999-0084352 | 12/1999 |
| WO | 03/094550 | 11/2003 |
| WO | 2006/075870 | 7/2006 |
| WO | 2007/044173 | 4/2007 |

OTHER PUBLICATIONS

"IEEE Std 802.11g Part 11: Wireless LAN Medium Access Control (MAC) and Physical Layer (PHY) specifications, Amendment 4: Further Higher Data Rate Extension in the 2.4 GHz Band" IEEE Computer Society, Published by the Institute of Electrical and Electronics Engineers, Inc. Jun. 27, 2003.

"IEEE Std. 802.16, Part 16: Air Interface for Fixed Broadband Wireless Access Systems" IEEE Computer Society and the IEEE Microwave Theory and Techniques Society, Oct. 1, 2004.

"IEEE Std. 802.16e, Part 16: Air Interface for Fixed Broadband Wireless Access Systems, Amendment 2: Physical and Medium Access Control Layers for Combined Fixed and Mobile Operation in Licensed Bands and Corrigendum 1" IEEE Computer Society and the IEEE Microwave Theory and Techniques Society, Feb. 28, 2006.

European Search Report dated Mar. 25, 2011, from corresponding European Application No. 08 15 7625.

WiMAX. "Mobile WiMAX—Part I: A Technical Overview and Performance Evaluation" Aug. 1, 2006, retrieved from: http://www.wimaxforum.org/technology/downloads/Mobile_WiMAX_Part1_Overview_and_Performance.pdf>.

Motorola. "VoIP Minimum Spectrum Allocation & Frequency Switching" 3GPP TSG RAN1 #46, Aug. 25, 2006.

China Unicomm, et al. "Joint Proposal for 3GPP2 Physical Layer for FDD Spectra" Jul. 31, 2006, retrieved from: http://www.3gcn.org/3gpp2/TSGC/Working/2006/2006-07-Montreal/TSG-C-2006-07-31-Montreal/WG3/.

Samsung. "Discussion on Control Signalling for Persistent Scheduling of VoIP" 3GPP TSG RAN WG1 Meeting #47, Nov. 1, 2006.

Korean Notice of Preliminary Rejection dated Sep. 28, 2011, from corresponding Korean Application No. 10-2010-112150.

Chinese Second Office Action dated Nov. 16, 2011, from corresponding Chinese Application No. 200810144722.9.

Notification of Reasons for Refusal dated Jul. 17, 2012, from corresponding Japanese Application No. 2008-209303.

European Search Report dated May 29, 2012, from corresponding European Application No. 12 16 0228.

Rapporteur (Motorola). "Report of E-Mail Discussion: DL Scheduling" 3rd Generation Partnership Project (3GPP) TSG-RAN WG2, R2-063, Dec. 12, 2006.

China Unicom, et al. "Joint Proposal for 3GPP2 Physical Layer for FDD Spectra", Jul. 31, 2006, Retrieved from http://www.3gcn.org/3gpp2/TSGC/Working/2006/2006-07-Montreal/TSG-C-2006-07-31-Montreal/WG3. Retrieved on Feb. 11, 2008.

Motorola. "E-UTRA Uplink Control Signaling + TP" 3rd Generation Partnership Project, TSG-RAN WG1 #45, R1-061172, May 8-12, 2006.

Sharp. "Optimized L1/L2 Control Channel Formats", 3rd Generation Partnership Project, TSG-RAN WG2 #57, R2-070514, Feb. 12-17, 2007.

LG Electronics. "Group Scheduling for Downlink and Uplink" 3rd Generation Partnership Project, TSG RAN WG1 #47, R1-063171, Nov. 6-10, 2006.

Motorola. "Downlink Acknowledgement and Group Transmit Indicator Channels" 3rd Generation Partnership Project, TSG RAN WG1 #48bis, R1-071357, Mar. 26-30, 2007.

Motorola. "Scheduling for Voice" 3GPP TSG RAN WG1 ADHOC, R1-061734, Jun. 27, 2006.

Mitsubishi Electric. "Signalling Way of Resource Assignment" 3rd Generation Partnership Project, TSG RAN WG1 #46bis, R1-062542, Oct. 9-13, 2006.

\* cited by examiner

| Syntax | Size | Notes |
|---|---|---|
| Bitmap_Region_IE( ) { | - | - |
| Type | 4 bits | - |
| Length | 3 bits | - |
| Region_ID | 3 bits | Total of 8 possible regions |
| Reordering | 1 bit | 0 = no reordering<br>1 = reordering ( AMC ) |
| Bitmap_size | 3bits | 0b000 = 8 bits<br>0b001 = 16 bits<br>0b010 = 32 bits<br>0b011 = 64<br>0b100 = 128<br>0b101 = 256<br>0b111 = 512 |
| Time_offset | 8 bits | - |
| Frequency_offset | 8 bits | - |
| Time_duration | 5 bits | - |
| No. of Subchannels | 6 bits | - |
| } | - | - |

Fig.9

| Syntax | Size | Notes |
|---|---|---|
| Bitmap_Allocation_IE( ) { | - | - |
| No_of_Bursts | 4 bits | |
| for(n=0; n< No_of_Bursts; n++){ | - | |
| MCS (Modulation and coding scheme) | 4 bits | - |
| Boosting | 3 bits | 000: Normal (not boosted); 001: +6dB; 010: -6dB; 011: +9dB; 100: +3dB; 101:-3dB; 110: -9dB; 111:-12dB; |
| if (Re-ordering = 0) { | | - |
| Allocation_bitmap | 2^(Bitmap_size + 3) | |
| No. of Blocks | variable | This field is optional |
| Resource_Allocation_bitmap | 2[2^(Bitmap_size + 3)] | This can also be expressed as 2xAllocation_bitmap |
| }else if (Re-ordering = 1 ) { | - | - |
| Allocation_bitmap | 2^(Bitmap_size + 3) | |
| No. of Blocks | variable | This field is optional |
| Reorder_bitmap | variable | Depends on the number of blocks within the region |
| Resource_Allocation_bitmap | 2[2^(Bitmap_size + 3)] | This can also be expressed as 2xAllocation_bitmap |
| } | - | - |
| } | - | - |
| } | - | - |

*Fig.10*

| Syntax | Size | Notes |
|---|---|---|
| Bitmap_Allocation_IE( ) { | - | - |
| if (Re-ordering = 0 ) { | - | - |
| Allocation_bitmap | 2^(Bitmap_size + 3) | |
| MCS_bitmap | 2[2^(Bitmap_size + 3)] | This can also be determined as 2xAllocation_bitmap<br><br>2 bits per user:<br><br>00 = QPSK ½<br><br>01 = QPSK ¾<br><br>10 = 16-QAM ½<br><br>11 = 64-QAM ½ |
| Resource_Allocation_bitmap | 2[2^(Bitmap_size + 3)] | This can also be expressed as 2xAllocation_bitmap |
| }else if (Re-ordering = 1 ) { | - | - |
| Allocation_bitmap | 2^(Bitmap_size + 3) | |
| MCS_bitmap | 2[2^(Bitmap_size + 3)] | This can also be determined as 2xAllocation_bitmap<br><br>2 bits per user:<br><br>00 = QPSK ½<br><br>01 = QPSK ¾<br><br>10 = 16-QAM ½<br><br>11 = 64-QAM ½ |
| Reorder_bitmap | variable | Depends on the number of blocks within the region. |
| Resource_Allocation_bitmap | 2[2^(Bitmap_size + 3)] | This can also be expressed as 2xAllocation_bitmap |
| } | - | - |
| } | - | - |

*Fig.11*

| | WiMAX 802.16e (IEEE 802.16e-2005) | Proposed Signalling Mechanism (Option B) | |
|---|---|---|---|
| No. of users | 32 | 32 | |
| DL Signalling (bits) | 2040 | Without Reordering 384 | With Reordering 640 |

Fig.16

COMMUNICATION SYSTEMS

The present invention relates to communication systems, for example to OFDMA-based communication systems, and to signalling methods for use in such systems.

In previously-considered communication systems, a high degree of flexibility and controllability is built into the system specification so that many parameters of the communication can be specified. In order to provide such flexibility, a significant amount of control information is required to enable a large number of controllable parameters to be specified. This is particularly prevalent in multiple-access systems, in which communication with many apparatuses is carried out at the same time by dividing up resources in a communication frame, each apparatus requiring its own such control information. In such multiple-access systems, control parameters include for example identities of the apparatuses, corresponding resources allocated within the communication frame, modulating and coding schemes employed, and addressing information.

FIG. 1 is a schematic diagram of a previously-considered communication system 1. Communication system 1 comprises a base station (BS) 2, a relay station (RS) 4, and a plurality of mobile stations (MSs) 6. Base station 2 is connected for communication across a network 8, such as the Internet.

Communication system 1 is a wireless communication system, and in particular employs radio transmission as its means of communication between the base station 2, relay station 4, and mobile stations 6. As can be seen from FIG. 1, base station 2 is operable to communicate directly with mobile stations 6, or indirectly with other mobile stations 6 via relay station 4. It will be appreciated that FIG. 1 is schematic, and that for example base station 2 may be operable to communicate indirectly with mobile stations 6 via two or more relay stations 4. Communication systems employing such relay stations may generally be referred to as multihop systems.

Currently, there exists significant interest in the use of multihop techniques in packet based radio and other communication systems, where it is purported that such techniques will enable both extension in coverage range and increase in system capacity (throughput).

In a multihop communication system, communication signals are sent in a communication direction along a communication path (C) from a source apparatus to a destination apparatus via one or more intermediate apparatuses. FIG. 2 illustrates a single-cell two-hop wireless communication system comprising a base station BS (known in the context of 3 G communication systems as a "node-B" NB) a relay node RN (also known as a relay station RS) and a user equipment UE (also known as a mobile station MS). In the case where signals are being transmitted on the downlink (DL) from a base station to a destination user equipment via the relay node, the base station comprises the source station (S) and the user equipment comprises the destination station (D). In the case where communication signals are being transmitted on the uplink (UL) from a user equipment, via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

FIG. 3 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 3 is positioning of a nomadic relay station to allow penetration of coverage within a building that could be above, at, or below ground level.

Other applications are nomadic relay stations which are brought into effect for temporary cover, for example providing access during events or emergencies/disasters. A final application shown in the bottom right of FIG. 3 provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modelled by:

$$L = b + 10n \log d \quad (A)$$

where d (meters) is the transmitter-receiver separation, b(dB) and n are the pathloss parameters, and the absolute pathloss is given by $l = 10^{(L/10)}$.

The sum of the absolute path losses experienced over the indirect link SI (source to intermediate)+ID (intermediate to destination) may be less than the pathloss experienced over the direct link SD (source to destination). In other words it is possible for:

$$L(SI) + L(ID) < L(SD) \quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multihop (two-hop, three-hop, etc.) communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multihop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus, the channel distortion correction entity within a multicarrier receiver can be of significantly lower complexity than its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard-band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE 802.11a/g standard), and in wireless MAN applications such as WiMAX (based on the IEEE 802.16 standard). OFDM is often used in conjunction with channel coding, an error correction technique, to create coded OFDM or COFDM. COFDM is now widely used in digital telecommunications systems to improve the performance of an OFDM-based system in a multipath environment where variations in the channel distortion can be seen across both subcarriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, 0 \leq t \leq T_s \quad (1)$$

where $\Delta f$ is the sub-carrier separation in Hz, $T_s = 1/\Delta f$ is symbol time interval in seconds, and $c_n$ are the modulated source signals. The sub-carrier vector in (1) onto which each of the source signals is modulated $c \in C_n$, $c = (c_0, c_1 \ldots c_{N-1})$ is a vector of N constellation symbols from a finite constellation. At the receiver, the received time-domain signal is transformed back to frequency domain by applying a Discrete Fourier Transform (DFT) or Fast Fourier Transform (FFT) algorithm.

OFDMA (Orthogonal Frequency Division Multiple Access) is a multiple access variant of OFDM. OFDMA is therefore particularly useful in systems such as communication system 1 of FIG. 1, in order to allow more than one mobile station 6 to communicate with a relay station 4 or base station 2. It works, for example, by assigning a subset of sub-carriers to an individual user. This allows simultaneous transmission from several users leading to better spectral efficiency. However, there is still the issue of allowing bi-directional communication, that is, in the uplink and download directions, without interference.

In order to enable bi-directional communication between two system or network nodes (base station, relay station or mobile station), two well known different approaches exist for duplexing the two (forward or downlink, and reverse or uplink) communication links to overcome the physical limitation that a device cannot simultaneously transmit and receive on the same resource medium. The first, frequency division duplexing (FDD) involves operating the two links simultaneously but on different frequency bands by subdividing the transmission medium into two distinct bands, one for forward-link and the other for reverse-link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well-used techniques for single-hop wired and wireless communication systems. For example, the IEEE 802.16 standard incorporates both an FDD and TDD mode.

As an example, FIG. 4 illustrates the single hop TDD frame structure used in the OFDMA physical layer mode of the IEEE 802.16 standard (WiMAX). In the context of the present invention, a frame is considered to be a unit of communication resource having a predetermined frequency bandwidth and a predetermined time period.

Each frame is divided into DL and UL subframes, each being a discrete transmission interval. They are separated by Transmit/Receive and Receive/Transmit Transition Guard intervals (TTG and RTG respectively). Each DL subframe starts with a preamble followed by the Frame Control Header (FCH), the DL-MAP, and the UL-MAP.

The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

In current OFDMA based wireless communication systems such as IEEE 802.16e-2005, the overhead due to control signalling in the physical layer is cumbersome, especially when a large number of users are scheduled per frame. This undesired overhead is mainly due to the structure of the MAP's, where a large number of bits are required to inform the MS of its resource within the frame. This overhead can cause serious capacity degradation especially when a large number of users have small bandwidth requirements such as in VoIP (Voice over IP) applications. In this case, each user must be allocated a small resource within the frame using the DL and UL MAP, and the DL and UL MAP_IEs (Information Elements).

FIG. 5 illustrates a previously-considered TDD frame structure within the IEEE 802.16e-2005 standard, where seven users have been allocated one resource each within the downlink and uplink subframes (assuming one user occupies one burst).

In the TDD frame structure, the first symbol is occupied by a Preamble which is mainly used for synchronisation purposes and transmitter identification. On the second and third symbols following the Preamble is the FCH. The FCH is transmitted using a well-known format and provides sufficient information to decode the following MAP message, i.e. the MAP message length, coding scheme and active sub-channels. Following the FCH is the DL-MAP which may be followed by the UL-MAP. These MAP messages provide information on the allocated resource (slots) for management and transport connections within the frame as well as other control information. These MAPs contain DL-MAP_IEs and UL-MAP_IEs which define bursts within the frames, (i.e. one MAP_IE will typically relate to one burst within the frame). The information within these MAP_IEs, such as the subchannel offset and symbol offset, is important as it is used by the MS to locate its resource within the subframes. Other information, such as the CID (Connection Identifier), the modulation and coding scheme and the number of sub-channels, is also important as it will allow for successful demodulation and decoding of the data within the burst.

Considering the case where many users require small bandwidths such as in VoIP, then this signalling mechanism is inefficient and can have a serious impact on the achievable capacity of the system. This is because the ratio of number of bits carried in the burst to the number of bits required to define the burst is relatively small. Moreover, in order to provide full cell coverage, the broadcast MAPs typically require one or more repetitions. This normally ensures that all users can successfully demodulate and decode the desired control information. In most cases, the DL and UL MAPs will be repeated 4 or 6 times depending on the desired percentage of cell coverage and the prevailing propagation environment. The repeated broadcast data will therefore significantly increase overhead within the frame and as a result, will decrease the capacity of the system.

In a previously-considered WiMAX-based system, there are mechanisms for reducing the impact of large overhead due to having to ensure that all users receive the broadcast control information. For example, control information can be separated into a number of Sub-MAPs and the modulation and coding scheme can be varied for each Sub-MAP. However, the fundamental arrangement of medium access being based on 2D allocation in the DL still yields an inefficient mechanism especially for the case of low data-rate applications, particularly when the service flow properties result in a deterministic resource assignment pattern. One such example, is VoIP.

According to an embodiment of a first aspect of the present invention, there is provided a signalling method for use in a multiple-access communication system, the system comprising a first communication apparatus and a plurality of second communication apparatuses, the second communication apparatuses being operable to communicate with the first communication apparatus using respective parts of a shared communication frame and each using an available service level for such communication, the method comprising: assessing service-level requests from the second communication apparatuses to determine if there is a group of the second communication apparatuses that have corresponding service-level requirements; if it is determined that such a group exists, employing a first control scheme for transmission in the shared communication frame of communication control information for the second communication apparatuses of the group; and for any second communication apparatus not part of the group, employing a further control scheme different from said first control scheme for transmission in the shared communication frame of communication control information for that second communication apparatus, wherein the first and further control schemes are configured such that use of the first control scheme for said group of second communication apparatuses enables communication for more such second communication apparatuses to be supported in said shared communication frame than if such a further control scheme were used for said group of second communication apparatuses.

In this way, it is possible to employ a particular control scheme for a group of apparatuses having similar communication requirements to increase the number of such apparatuses supported in a single shared communication frame. Such a control scheme may for example take advantage of a redundant or over-specified nature of parameters in an existing system, and employ a reduced set of parameters instead to reduce control overhead. Similarly, such a control scheme may for example take advantage of an over-complicated expression of parameters in an existing system, and express parameters in a simpler form instead to reduce control overhead.

Such a method may be carried out alongside the use of existing control schemes or future control schemes, which can be advantageous from the point of view of backwards and forwards compatibility with other systems.

The system may be a wireless system, for example a radio-based communication system. One example is an OFDMA-based communication system.

Preferably, at least a predetermined number of said second communication apparatuses are needed to form such a group. For example, such a first control scheme may give significant benefits in terms of increased numbers of supported second communication apparatuses when the group size exceeds a certain number, or when it falls within a certain range.

The service-level requirements may include quality-of-service requirements, and/or a specification of a particular type of service, such as VoIP. Such service-level requirements may be "corresponding" for example if a number of them are identical, or similar to one another. Such service-level requirements may be similar to one another for example if they are all, or nearly all, within certain predetermined ranges or bounds. It may be determined that such a group exists if the second communication apparatuses concerned have a number of identical service-level requirements.

The first control scheme may specify fewer communication control parameters in its control information than the or each further control scheme. Use of the first control scheme, or the determination that such a group exists, may indicate that a number of communication control parameters have predetermined values, and the control information of the first control scheme may thus not include values for those communication control parameters. The control information of the first control scheme may be formulated in a reduced format compared to the control information of the or each further control scheme. The control information of the first control scheme may comprise combined control information for use by all second communication apparatuses of the group. Conversely, the control information of the or each further control scheme may comprise individual control information for use by a single second communication apparatus. All of these possibilities may enable the control overhead of such a communication system to be reduced (i.e. the amount of control information to be sent per second communication apparatus may be substantially reduced) thereby allowing a larger number of second communication apparatuses to be supported per frame.

The control information of the first control scheme may advantageously be arranged in a bitmap form, and the method may further comprise, as part of the first control scheme, informing the second communication apparatuses of the group of the location of their respective parts of the control information in the bitmap. The arrangement of the control information in bitmap form may be a particularly efficient arrangement of control information, allowing more information to be conveyed in a particular number of control bits than if the same information were arranged in a different form, for example using the format employed in the IEs of existing WiMAX systems (i.e. the 2-D allocation elements).

The shared communication frame may be configured to have a control area, in which case the method may preferably comprise using the control area for transmission of the control information of the first control scheme and control information of the or each further control scheme. That is, the control information of the first control scheme is preferably arranged such that it may be placed in a similar, or "expected", location in the frame as for other control schemes, thus permitting backwards and/or forwards compatibility with other systems. Data under the first control scheme may also be located in a similar location (a "data area") in the frame as for data under other control schemes, for similar reasons.

The shared communication frame may be configured to have a data area, in which case the method may preferably comprise, as part of the first control scheme, allocating resources in a region of the data area to the second communication apparatuses of the group and including in the control information of the first control scheme information identifying the allocated resources for each second communication apparatus of the group.

Preferably, as part of the first control scheme, the method may comprise selecting based on the service-level requests of the group a number of minimum resource allocation units of the shared communication frame to form a combined resource allocation unit and allocating resources of the shared communication frame to the second communication apparatuses of the group in combined resource allocation units. It may be that allocation units smaller than the combined resource allocation units are not required, in which case it may be possible to save on control information in this way.

The signalling method preferably comprises: determining for at least one of the second communication apparatuses whether it is compatible with said first control scheme; and for any second communication apparatus determined to be not compatible with said first control scheme, designating that second communication apparatus as not capable of being part of said group and employing a said further control scheme for that second communication apparatus.

The system may be an OFDM or OFDMA system, and the shared communication frame may be an OFDM or OFDMA time-division-duplex (TDD) frame or a downlink or uplink sub-frame thereof. The or each first communication apparatus may be a base station or a relay station. The or each second communication apparatus may be a mobile station or a relay station.

According to an embodiment of a second aspect of the present invention, there is provided a multiple-access communication system, comprising: a first communication apparatus; a plurality of second communication apparatuses operable to communicate with the first communication apparatus using respective parts of a shared communication frame and each using an available service level for such communication; assessing means operable to assess service-level requests from the second communication apparatuses to determine if there is a group of the second communication apparatuses that have corresponding service-level requirements; first control means operable, if it is determined that such a group exists, to employ a first control scheme for transmission in the shared communication frame of communication control information for the second communication apparatuses of the group; and second control means operable, for any second communication apparatus not part of the group, to employ a further control scheme different from said first control scheme for transmission in the shared communication frame of communication control information for that second communication apparatus, wherein the first and further control schemes are configured such that use of the first control scheme for said group of second communication apparatuses enables communication for more such second communication apparatuses to be supported in said shared communication frame than if such a further control scheme were used for said group of second communication apparatuses.

According to an embodiment of a third aspect of the present invention, there is provided a communication apparatus for use in a multiple-access communication system, the system further comprising a plurality of further communication apparatuses operable to communicate with the claimed communication apparatus using respective parts of a shared communication frame and each using an available service level for such communication, the claimed communication apparatus comprising: assessing means operable to assess service-level requests from the further communication apparatuses to determine if there is a group of the further communication apparatuses that have corresponding service-level requirements; first control means, operable, if it is determined that such a group exists, to employ a first control scheme for transmission in the shared communication frame of communication control information for the further communication apparatuses of the group; and second control means operable, for any further communication apparatus not part of the group, to employ a further control scheme different from said first control scheme for transmission in the shared communication frame of communication control information for that further communication apparatus, wherein the first and further control schemes are configured such that use of the first control scheme for said group of further communication apparatuses enables communication for more such further communication apparatuses to be supported in said shared communication frame than if such a further control scheme were used for said group of further communication apparatuses.

According to an embodiment of a fourth aspect of the present invention, there is provided a computer program which, when executed on a computing device of a multiple-access communication system, is operable to carry out a signalling method, the system comprising a first communication apparatus and a plurality of second communication apparatuses, the second communication apparatuses being operable to communicate with the first communication apparatus using respective parts of a shared communication frame and each using an available service level for such communication, the method comprising: assessing service-level requests from the second communication apparatuses to determine if there is a group of the second communication apparatuses that have corresponding service-level requirements; if it is determined that such a group exists, employing a first control scheme for transmission in the shared communication frame of communication control information for the second communication apparatuses of the group; and for any second communication apparatus not part of the group, employing a further control scheme different from said first control scheme for transmission in the shared communication frame of communication control information for that second communication apparatus, wherein the first and further control schemes are configured such that use of the first control scheme for said group of second communication apparatuses enables communication for more such second communication apparatuses to be supported in said shared communication frame than if such a further control scheme were used for said group of second communication apparatuses.

According to an embodiment of a fifth aspect of the present invention, there is provided a computer program which, when executed on a computing device of a first communication apparatus of a multiple-access communication system, is operable to carry out a signalling method, the system further comprising a plurality of second communication apparatuses operable to communicate with the first communication apparatus using respective parts of a shared communication frame and each using an available service level for such communication, the method comprising: assessing service-level requests from the second communication apparatuses to determine if there is a group of the second communication apparatuses that have corresponding service-level requirements; if it is determined that such a group exists, employing a first control scheme for transmission in the shared communication frame of communication control information for the second communication apparatuses of the group; and for any second communication apparatus not part of the group, employing a further control scheme different from said first control scheme for transmission in the shared communication frame of communication control information for that second communication apparatus, wherein the first and further control schemes are configured such that use of the first control scheme for said group of second communication apparatuses enables communication for more such second communication apparatuses to be supported in said shared communication frame than if such a further control scheme were used for said group of second communication apparatuses.

Method aspects apply equally to system, apparatus and computer program aspects, and vice versa.

Reference will now be made, by way of example, to the accompanying drawings, of which:—

FIG. 1, mentioned hereinbefore, is a schematic diagram of a previously-considered communication system;

FIG. 2, mentioned hereinbefore, shows a single-cell two-hop wireless communication system;

FIG. 3, mentioned hereinbefore, shows applications of relay stations;

FIG. 4, mentioned hereinbefore, shows a single-hop TDD frame structure used in the OFDMA physical layer mode of the IEEE 802.16 standard;

FIG. 5, mentioned hereinbefore, shows a TDD OFDMA frame structure used in the IEEE 802.16e-2005 standard;

FIG. 9 is a table which provides details of a possible scheme for a Bitmap_Region_IE;

FIG. 10 is a table that provides details of a possible scheme for a Bitmap_Allocation_IE (for option A);

FIG. 11 is a table that provides details of a possible scheme for a Bitmap_Allocation_IE (for Option B);

FIG. 16 is a table for comparing the signalling overheads for the signalling mechanism used in the WiMAX 802.16e (IEEE 802.16e-2005) standard with a proposed signalling mechanism according to an embodiment of the present invention.

Figure 6A:
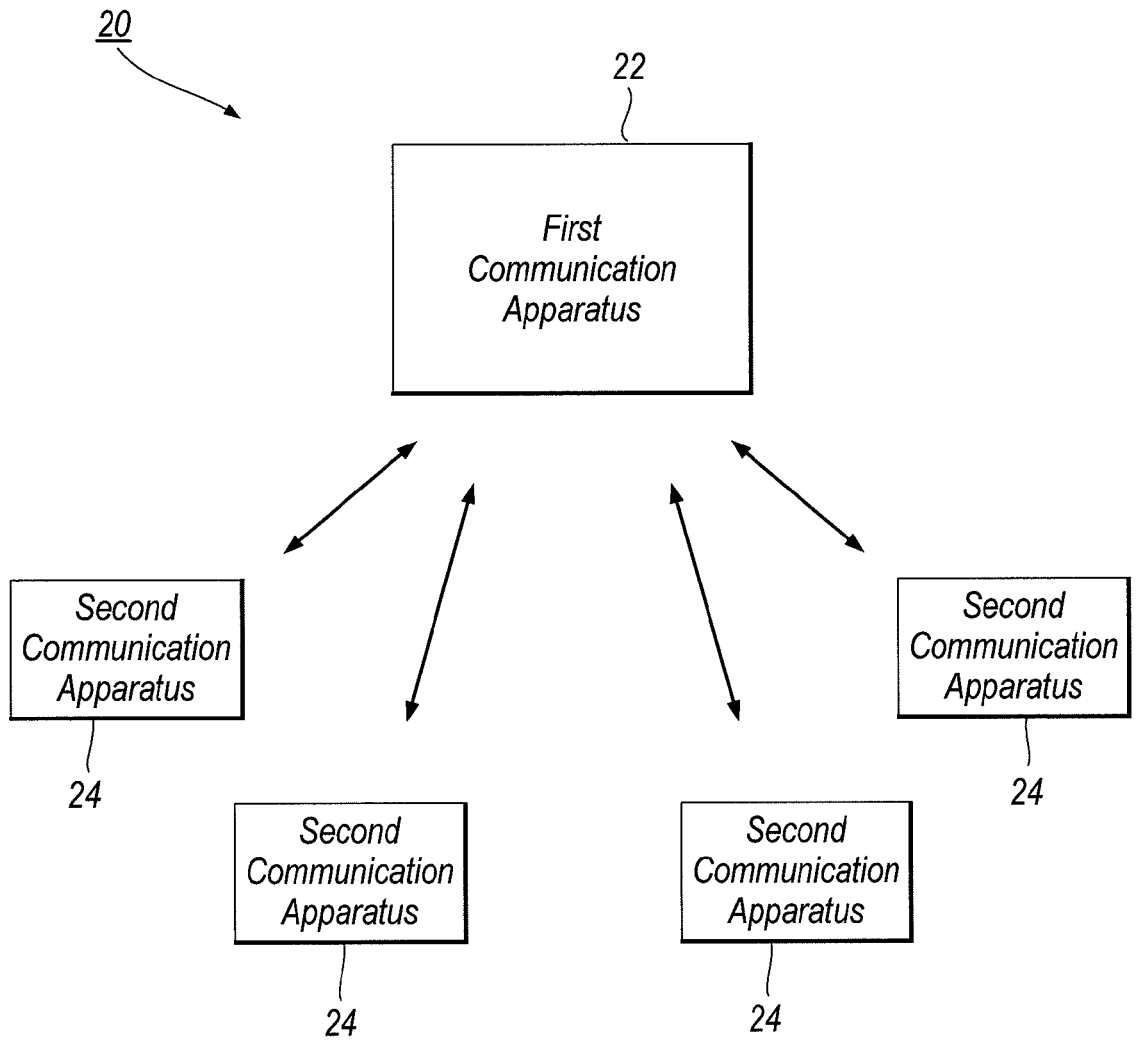
FIG. 6A is a schematic diagram of a communication system 20 embodying the present invention.

FIG. 6A is a schematic diagram of a communication system 20 embodying the present invention. Communication system 20 comprises a first communication apparatus 22 and a plurality of second communication apparatuses 24. The communication system may have any number of second communication apparatuses 24.

The communication system 20 is a multiple-access system and the second communication apparatuses 24 are operable to communicate with the first communication apparatus 22 using respective parts of a shared communication frame. Such a shared communication frame may be employed to carry control information and data for the communication of each of the second communication apparatuses 24. Each second communication apparatus 24 may carry out such communication using a communication service of a set of available services, or using an available service level.

Figure 1:
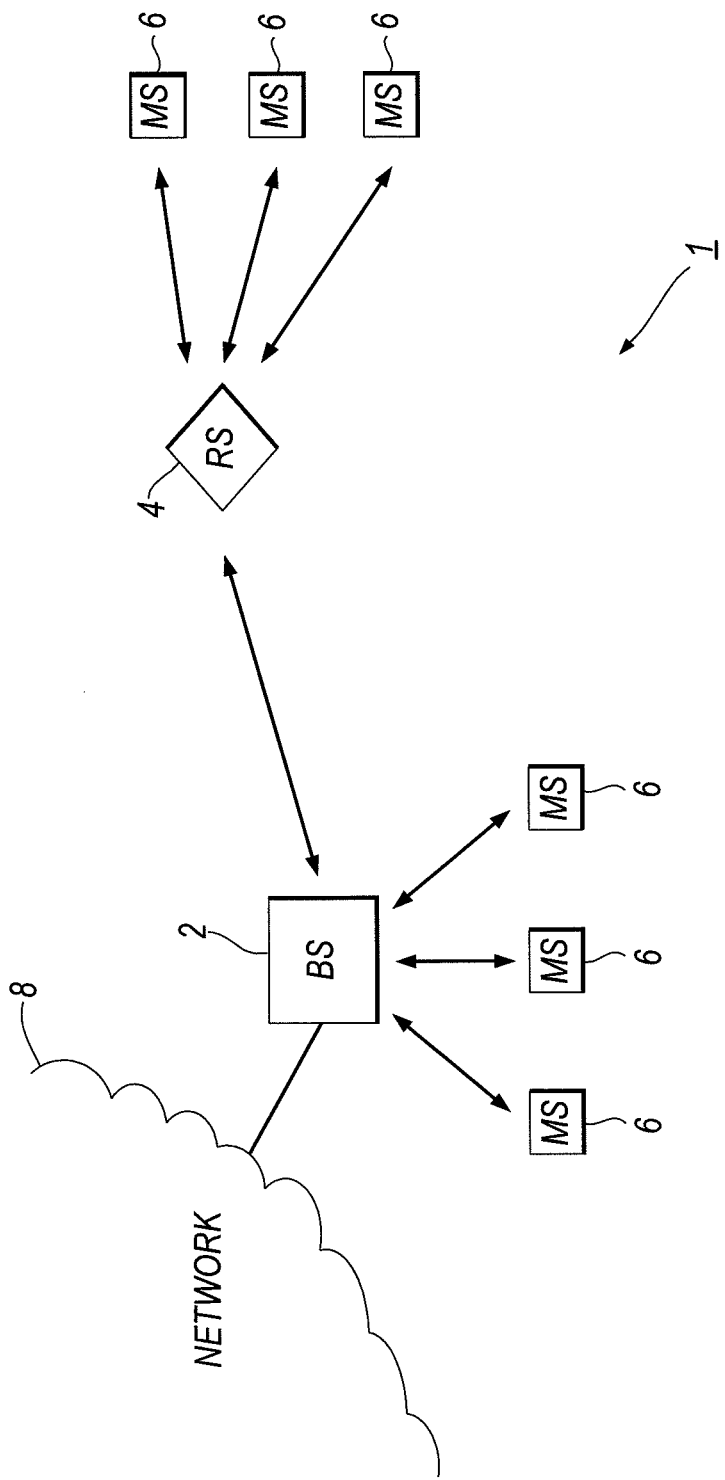
Figure 2:
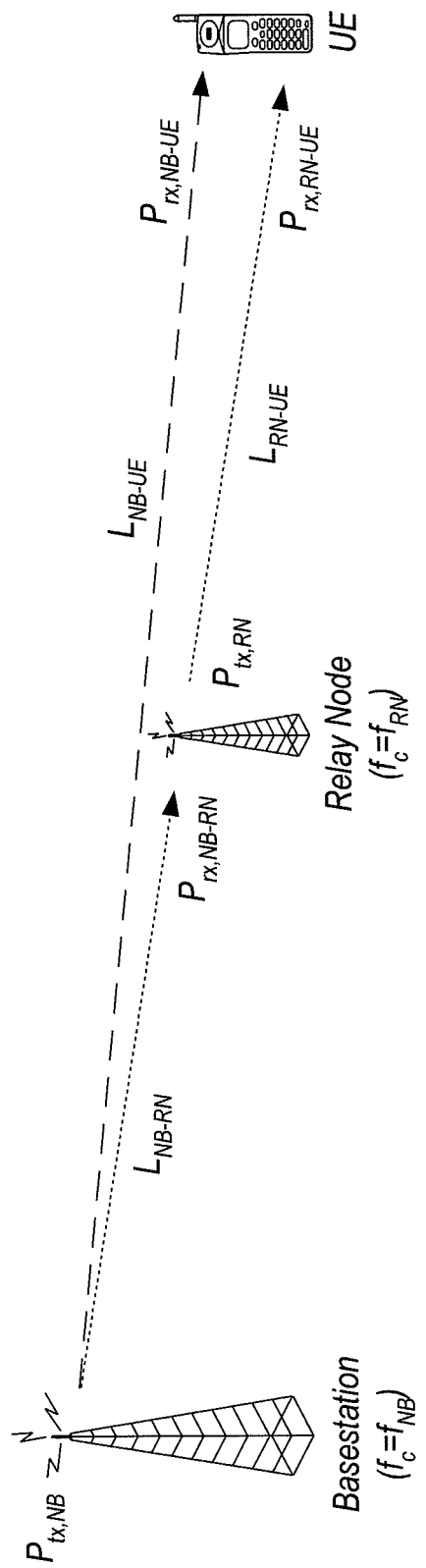
Figure 3A:
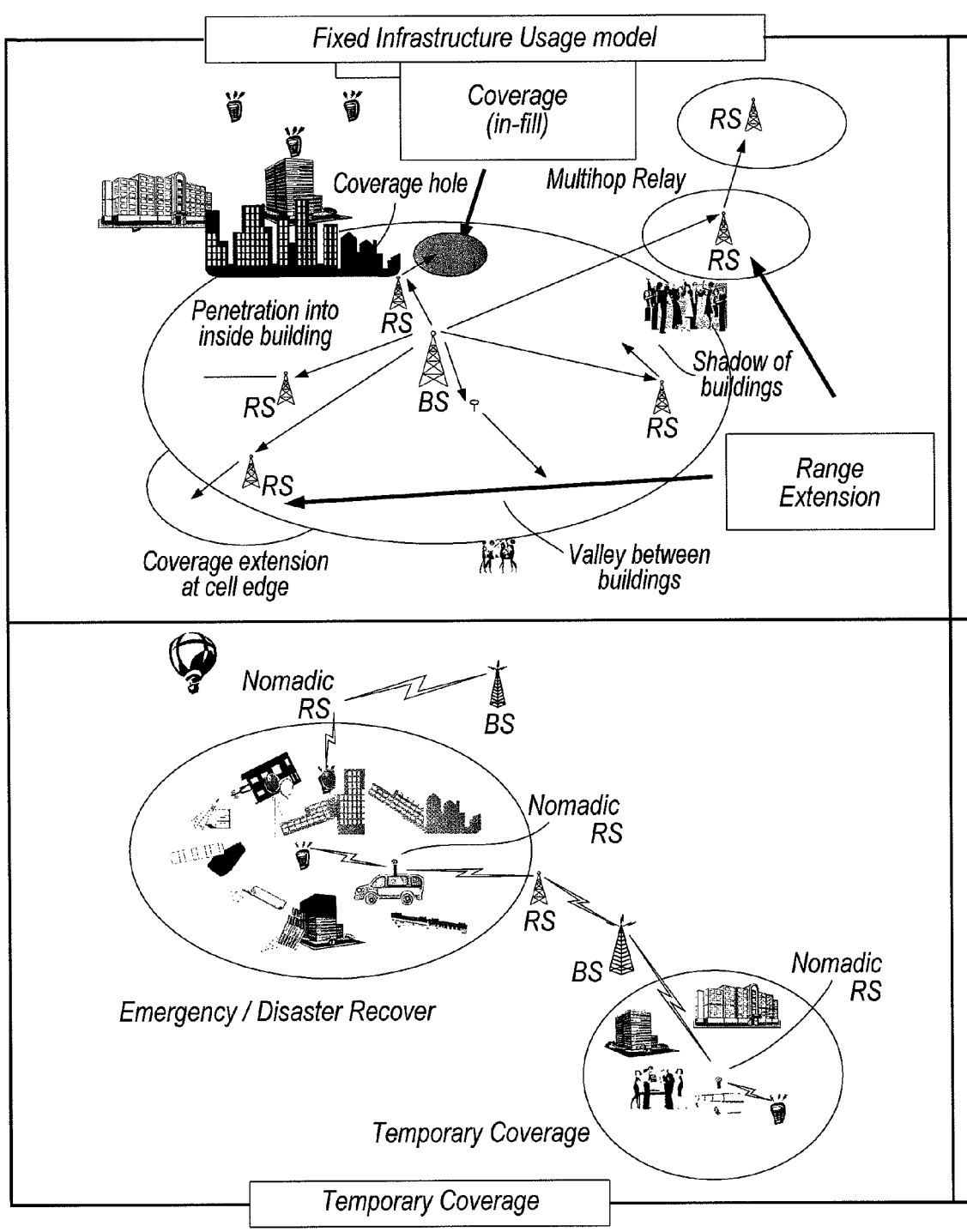
Figure 3B:
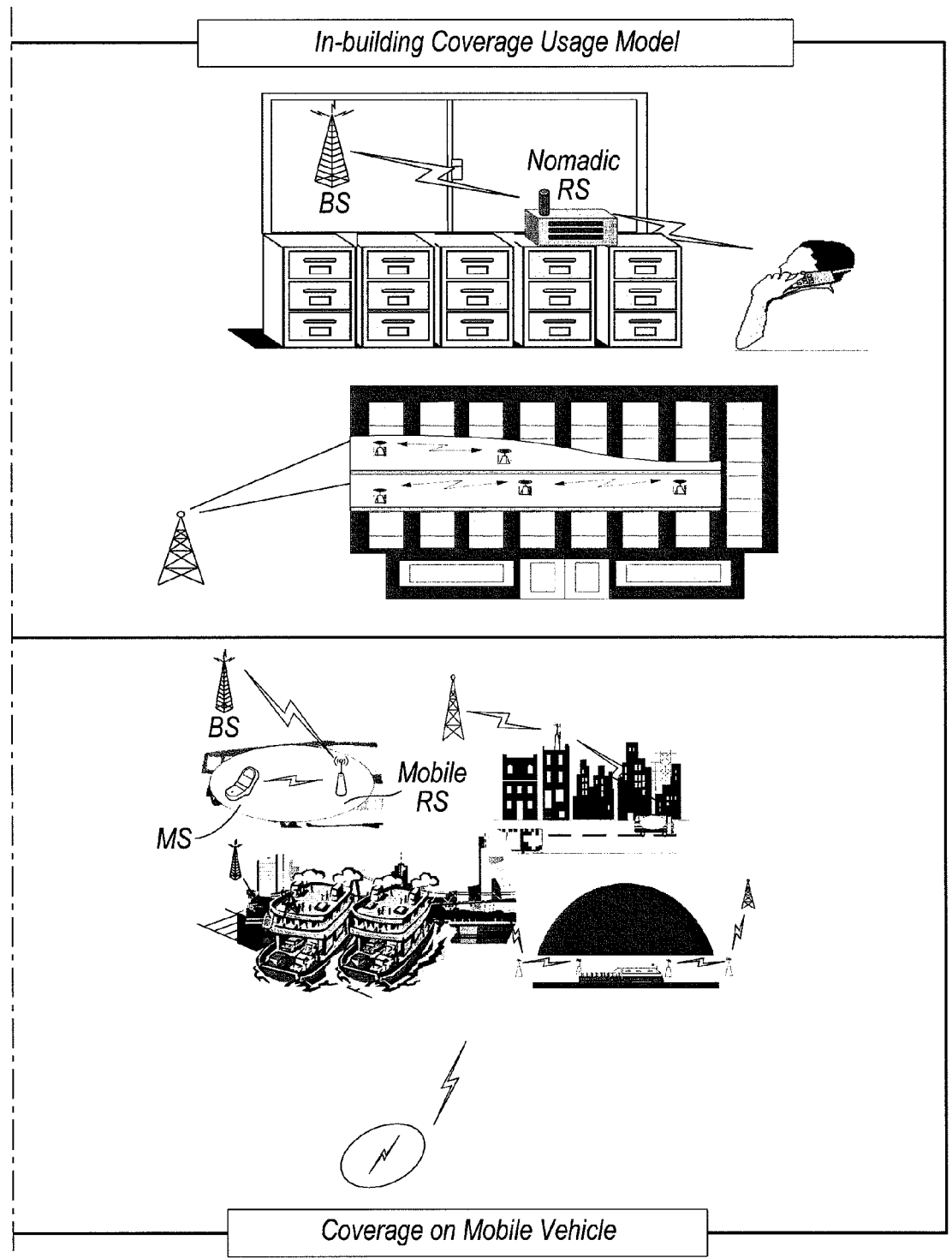

The first communication apparatus 22 may be a base station, such as base station 2 of FIG. 1, or a relay station, such as relay station 4 of FIG. 1. Similarly, the second communication apparatuses 24 may be mobile stations, such as mobile stations 6 of FIG. 1, or relay stations, each such as relay station 4 of FIG. 1.

Figure 6B:
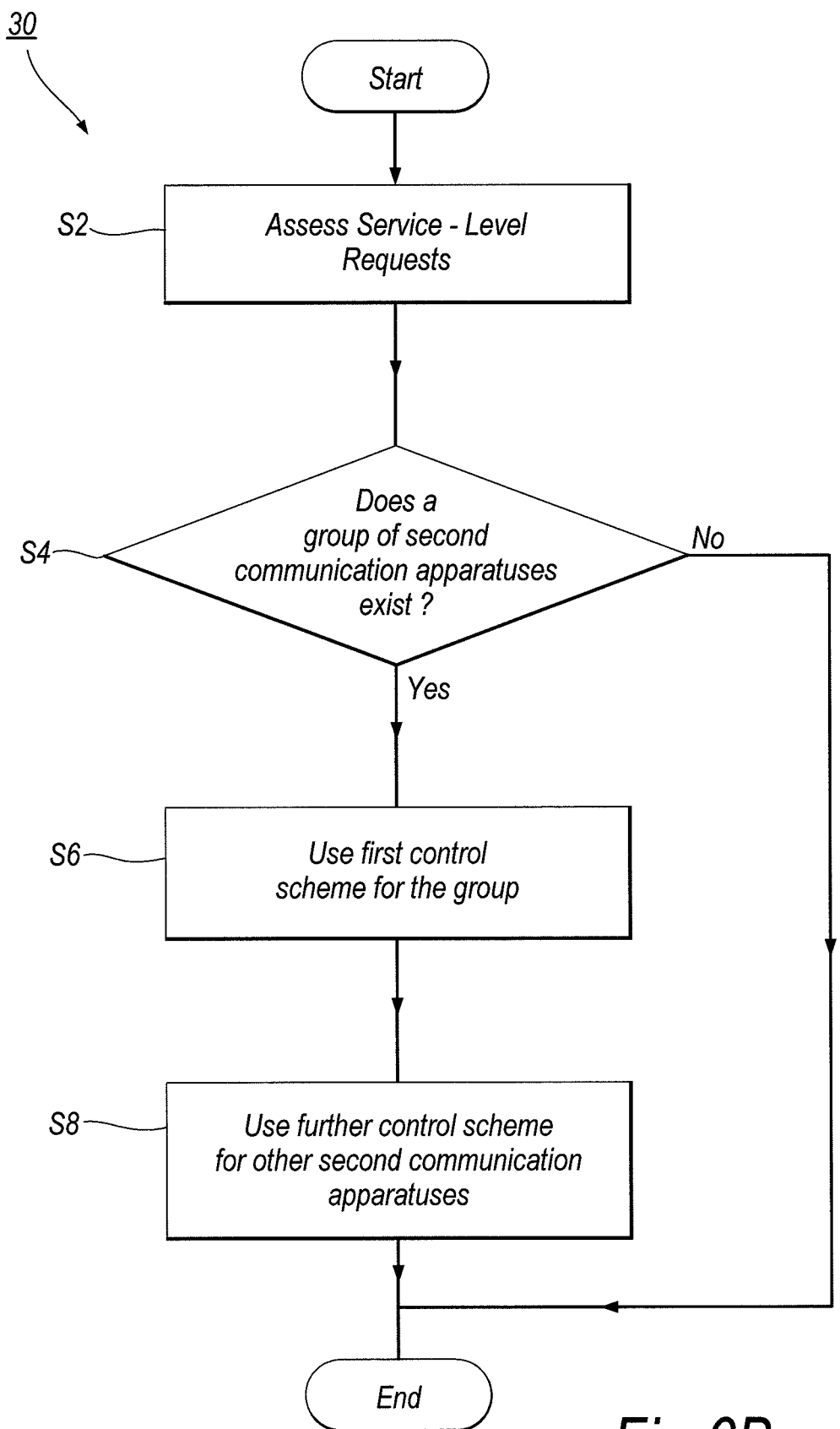
FIG. 6B is a flow-chart representation of a signalling method 30 embodying the present invention.

Communication system 20 is configured to carry out a signalling method embodying the present invention. FIG. 6B is a flow-chart representation of a signalling method 30 embodying the present invention.

Signalling method 30 comprises steps S2, S4 S6 and S8. In step S2, service-level requests of the second communication apparatuses 24 are assessed. In step S4, it is determined whether a group of the second communication apparatuses 24 that have corresponding service-level requests exists. Such a group may exist for example if there are five (or any other predetermined number) second communication apparatuses 24 each having the same service-level requirements, or closely similar service-level requirements. If it is determined that such a group does not exist, the method 30 terminates. If, however, it is determined that such a group does exist, a first control scheme is used for the group of second communication apparatuses and a further control scheme is used for the or each other such second communication apparatus.

Figure 6C:
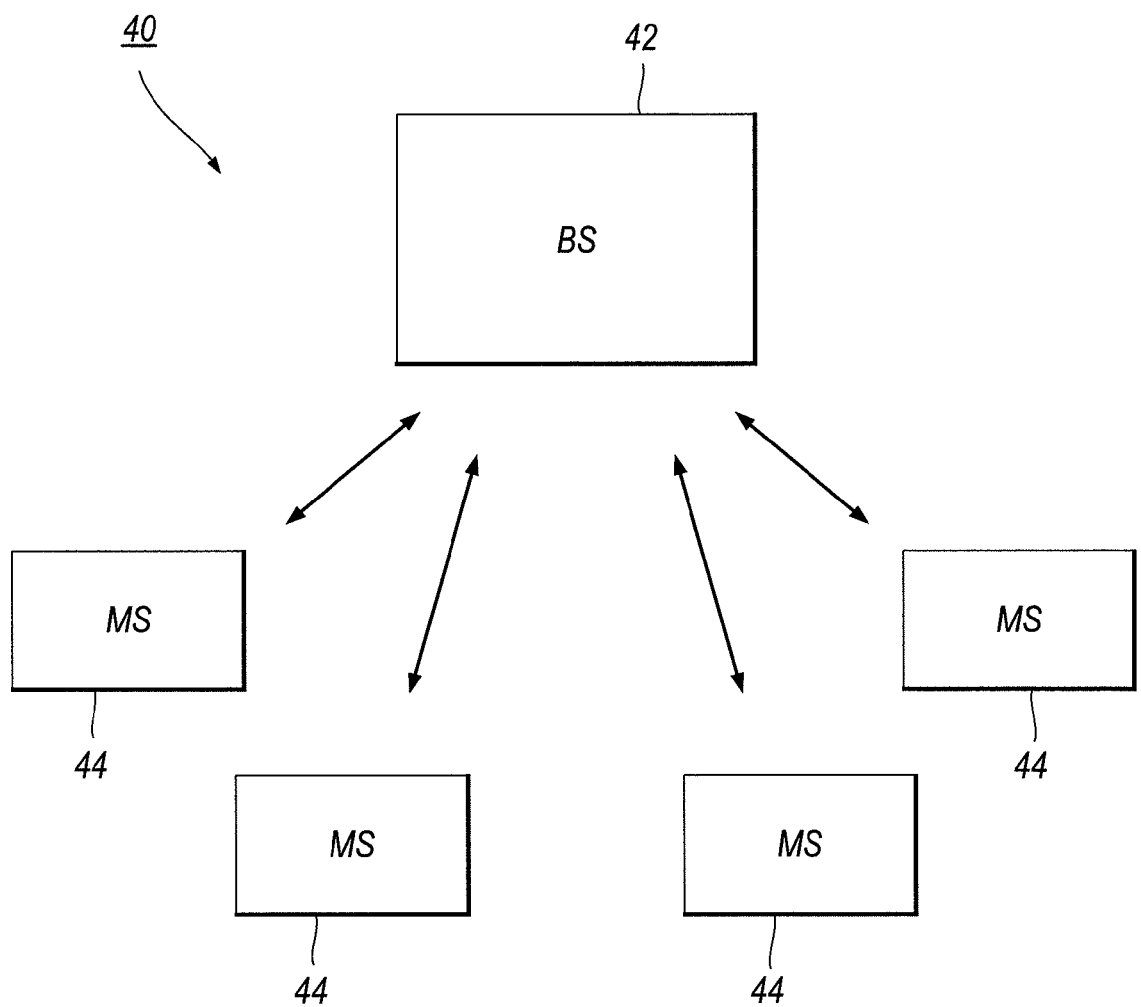
FIG. 6C is a schematic diagram of a communication system 40 embodying the present invention.

FIG. 6C is a schematic diagram of a communication system 40 embodying the present invention. Communication system 40 comprises a base station (first communication apparatus) 42 and a plurality of mobile stations (second communication apparatuses) 44. The communication system 40 may have any number of mobile stations 44. The base station 42 (or each mobile station 44) may alternatively be a relay station.

Figure 4:
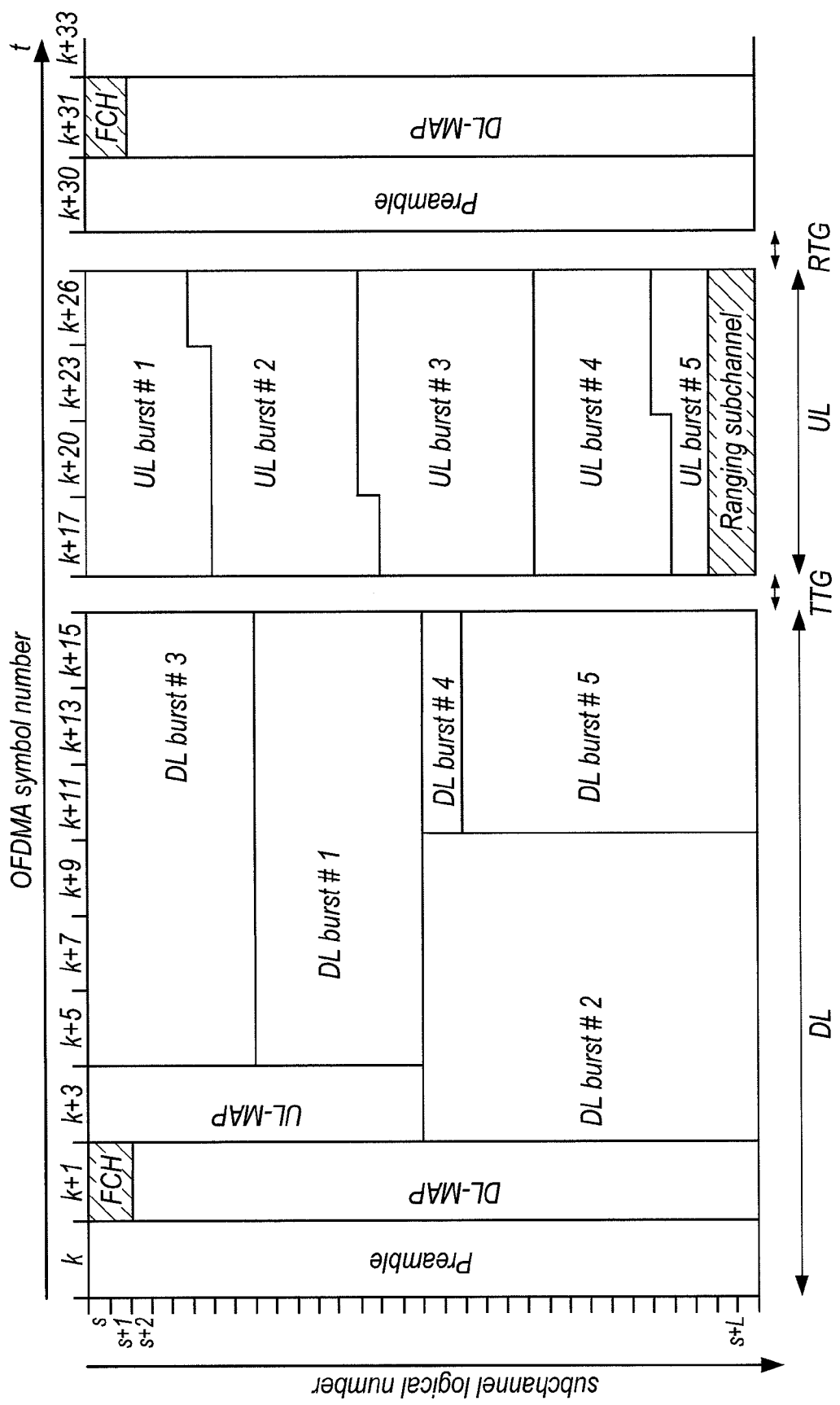
Figure 5:
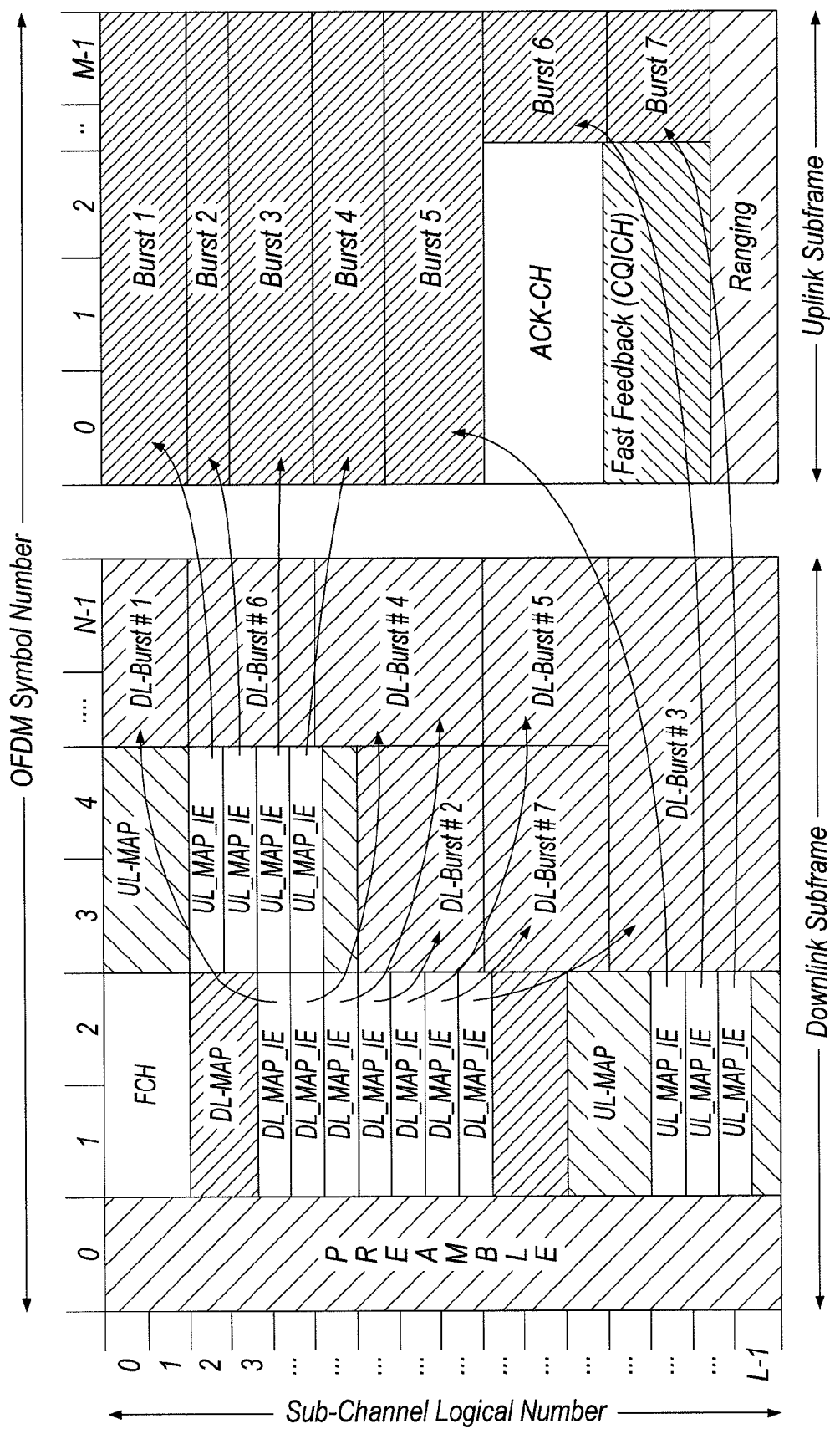

The communication system 40 is an OFDMA-based system, for example a WiMAX system, and the mobile stations 44 are operable to communicate with the base station 42 using respective parts of an OFDMA TDD frame, similar to the frames shown in FIGS. 4 and 5. Each mobile station 44 may carry out such communication using an available service level, for example using a VoIP service with particular QoS requirements.

Communication system 40 is configured to carry out a signalling method embodying the present invention. An example of such a signalling method will now be described, using a WiMAX OFDMA system as a preferred type of system for embodiments of the present invention. It will of course be appreciated that the present invention could apply analogously to other types of system, such as multiple-access communication systems that are based on packet switched connections.

The present signalling method has two main stages. The first stage involves a service-setup procedure, i.e. a MAC (Media Access Control) layer (data-link layer) procedure. In the first stage, users (mobile stations 44) with similar QoS requirements are grouped together and the group is then assigned to a resource within the OFDMA frame where it will be informed of and receive resource allocation for the purposes of data transport. In the case of a WiMAX system, this resource is a number of slots of the frame in the form of a region. The assignment may be unchanged for the entire session, which comprises a series of successive such OFDMA frames. This first stage is particularly beneficial for a service class (service level/service band/service flow) such as VoIP, because payload packets for VoIP services are approximately the same size. VoIP payload packets are also relatively small in size, compared to other services that may be provided using the OFDMA frames, such as FTP (File Transfer Protocol) and Video-Streaming services. VoIP payload packets are also generated periodically, and therefore the resulting allocation pattern will be to some degree deterministic. These properties of service classes such as VoIP can be exploited in embodiments of the present invention to benefit from reduced signalling overhead. Other service classes that may be exploited in embodiments of the present invention include channelised services, such as leased-line services and constant-rate services having small payload packets.

The second stage of the present signalling method relates to physical-layer resource allocation within the assigned region (a physical-layer procedure), where the mobile station 44 receives signalling information that informs it of the resources allocated to it.

The present signalling method will now be considered in more detail, with reference to FIGS. 7 to 15. As before, and by way of example, the present signalling method will continue to be described using a WiMAX OFDMA system as a preferred type of system for embodiments of the present invention.

Figure 7:
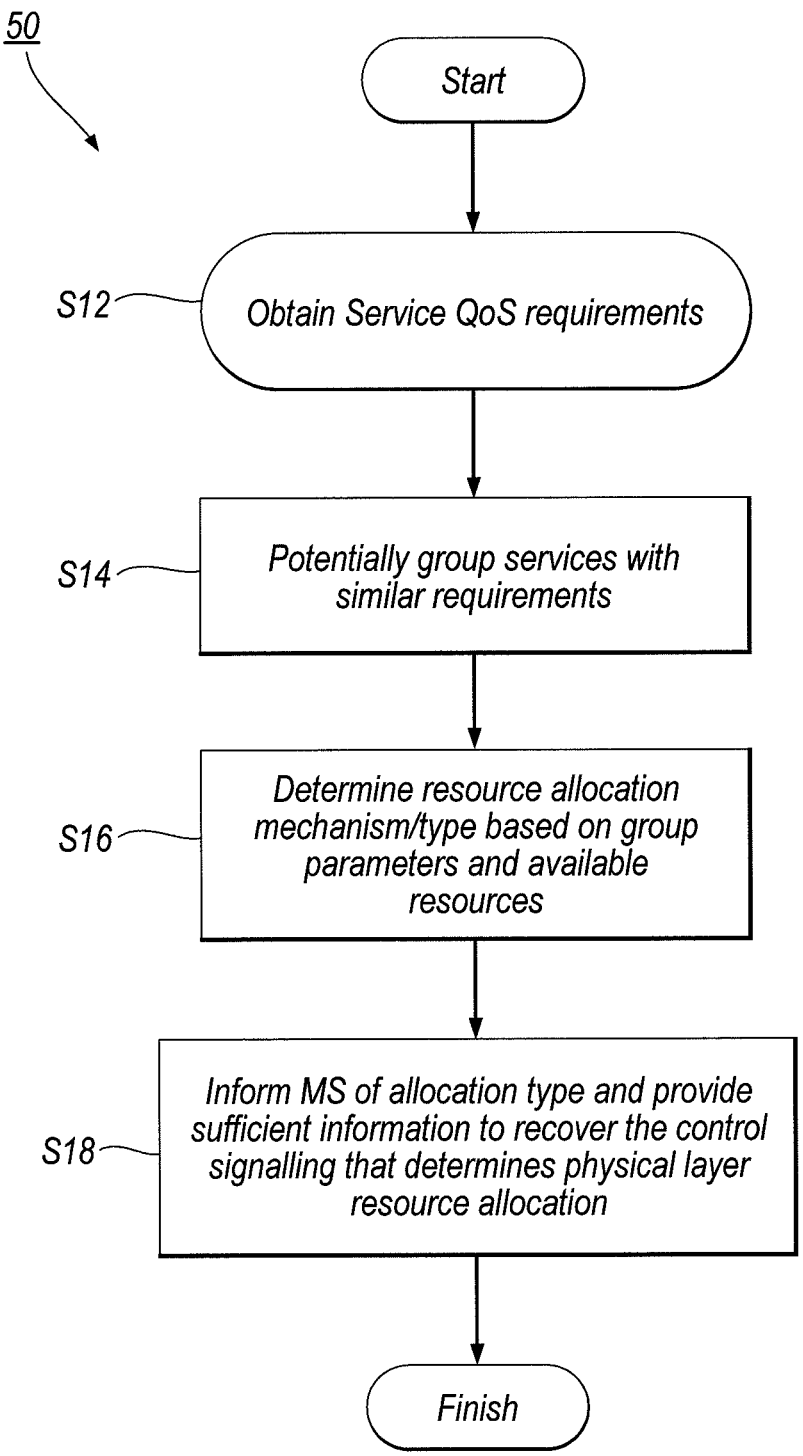
FIG. 7 is a flow-chart representation of a signalling method 50 for use in an embodiment of the present invention.

FIG. 7 is a flow-chart representation of a signalling method 50 embodying the present invention. Signalling method 50 is a (MAC Layer) service-setup procedure, corresponding to the first stage mentioned above, and has steps S12, S14, S16, and S18.

In step S12, the BS (base station 42) obtains the QoS (Quality of Service) requirements from the MSs (mobile stations 44), and in this case looks for the QoS requirements for a particular requested service such as VoIP. In step S14, the BS can then potentially group requested services (and therefore effectively MSs) with similar requirements, e.g. with similar or even partially identical QoS requirements. In step S16, the BS can then determine which resource allocation type (control scheme) to use based on the requirements of the group and the available resources. In the case where the group has VoIP requirements, or other similar properties, bitmap signalling can be used because this will significantly reduce overhead as will become apparent. Accordingly, in step S18, the BS informs the MSs of the chosen allocation mechanism and provides sufficient information for the MSs to recover the control signalling that determines the physical resource allocation within the assigned region.

Regarding step S18, information which may be provided to the MSs includes in which region(s) of the OFDMA frame they will be allocated resources, for example in the form of an ID for each such region (a "Region ID"), the bit number/position for each MS in the bitmap (when bitmap signalling is used) for each region identified, the mapping of resource blocks within the or each region, including whether the indexing system increases in a frequency- or time-first manner, and the size of resource blocks within the or each region in units of minimum allocation units. Such minimum allocation units in the case of WiMAX OFDMA frames are known as slots. Based on the QoS requirements of the group of MSs, it can be possible to employ resource blocks (each comprising a predetermined number of slots) as the minimum allocation unit for that service level, as it may be the case that a unit size smaller than the resource block (combined allocation unit) is not required. In that case, it is not necessary to allocate resources in units of slots. By exploiting this property of service classes such as VoIP, a further saving in control information overhead can be achieved by embodiments of the present invention.

Figure 8:
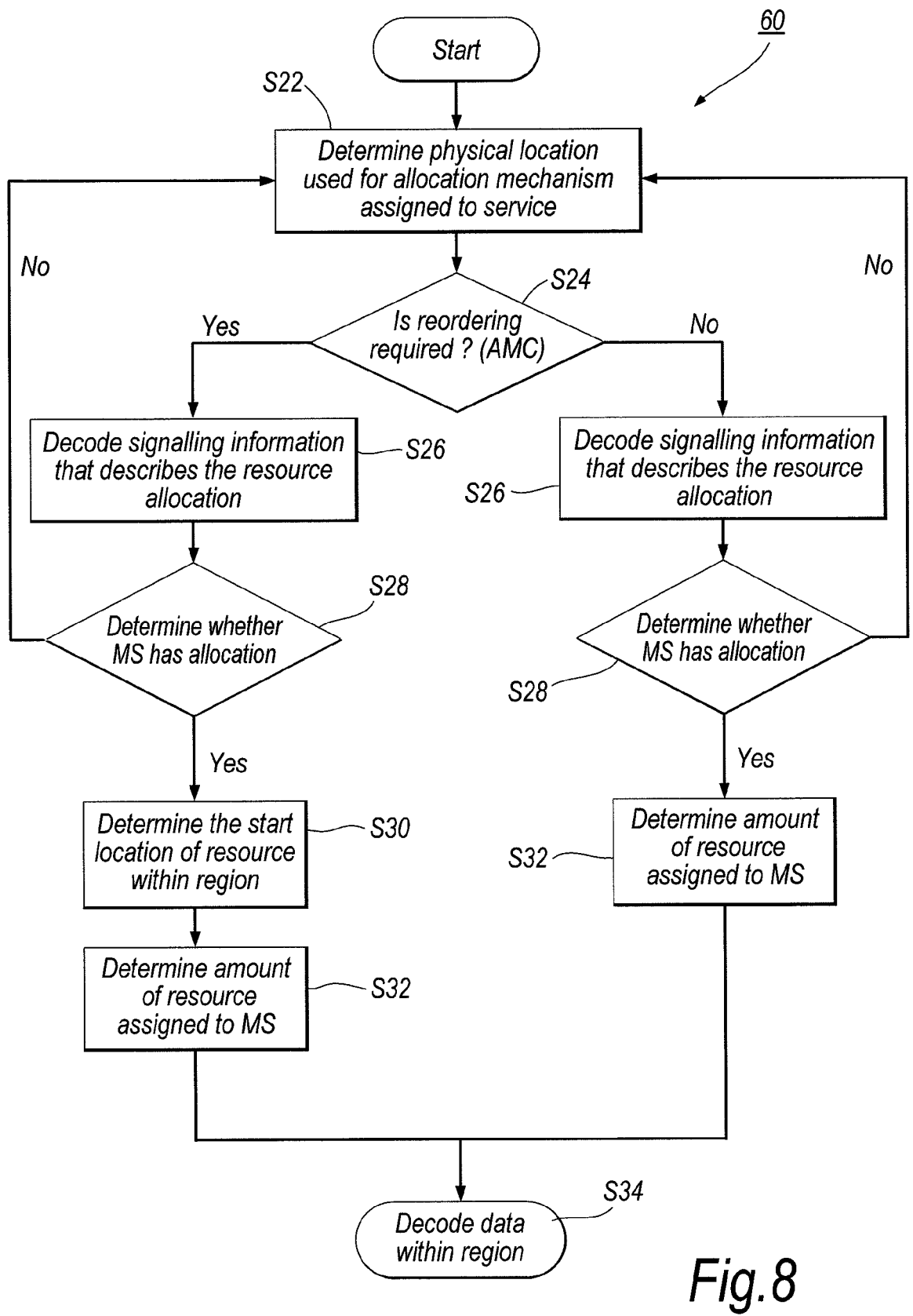
FIG. 8 is a flow-chart representation of a signalling method 60 for use in an embodiment of the present invention.

FIG. 8 is a flow-chart representation of a signalling method 60 for use in an embodiment of the present invention. Signalling method 60 is a (Physical Layer) resource-allocation procedure, corresponding to the second stage mentioned above, and has steps S22, S24, S26, S28, S30, S32 and S34.

As is the case for signalling method 50, signalling method 60 involves the provision of certain information in the OFDMA frame by the base station 42, and the interpretation of that information by the mobile stations (MSs) 44 of the group identified in step S14 of method 50. For simplicity, the following description of method 60 will be presented from the point of view of one of the mobile stations 44 of the group interpreting the information in the OFDMA frame.

In step S22, the MS determines the physical location of the region(s) of the communication frame to which its service flow has been assigned, and the transmission parameters used within that or those regions. For example, this may include determining the time and frequency offset of the region(s) within the communication frame relative to a point of reference (an index location) in the frame, and determining if reordering of the MSs of the group allocated to the region(s) is required.

The MSs are assigned an initial order in which they will be assigned resources in the allocated region(s), for example by means of the bit position provided in step S18 of method 50. Such reordering may however be necessary, for example to ensure that a particular MS is allocated resources on a particular OFDMA sub-carrier or set of sub-carriers to improve signal quality for that MS.

In the present example, the MSs of the group are provided with the information to determine the physical location of the region(s) of the communication frame to which the group's service flow has been assigned by means of a message per region, called a Bitmap_Region_IE, contained within the broadcast MAP message of the OFDMA frame. FIG. 9 is a table which provides details of a possible scheme for such a Bitmap_Region_IE.

As can be seen from FIG. 9, each Bitmap_Region_IE in the present example includes the following (fields) sections: Type, Length, Region_ID, Reordering, Bitmap_size, Time_offset, Frequency_offset, Time_duration, and No. of Subchannels.

The Type section enables the MS to determine the type of MAP IE (in this case, the Bitmap_Region_IE). The Length section enables the MS to know where the IE ends and the next starts.

The Region_ID section is made up of 3 bits to enable the specified region to be one of a possible eight regions. Of course, more bits could be employed to enable a larger number of possible regions to be used. By comparing this section to the Region ID provided to it in step S18 of method 50, the MS can determine whether it has located the Bitmap_Region_IE for its allocated region.

The Reordering section is made up of a single bit, and simply indicates whether or not reordering is required.

The Bitmap_size section is made up of 3 bits, and indicates the size of the bitmap used for bitmap signalling. The three-bit value is used as a parameter to interpret information in the Bitmap_Allocation_IE for that region, as can be seen from FIGS. 10 and 11 which are discussed later.

The Time_offset, Frequency_offset, Time_duration, and No. of Subchannels sections are made up of different numbers of bits as shown in FIG. 9, and are used to identify the location and size of the region to which the Bitmap_Region_IE corresponds. For example, visualising the OFDMA frame as a rectangular grid with a vertical dimension in frequency (i.e. divided up into sub-carriers or sub-channels) and a horizontal dimension in time (i.e. divided up into symbol lengths), the Time_offset and Frequency_offset sections may specify one corner of a rectangular region of the frame, and the Time_duration and No. of Subchannels sections may specify the vertical and horizontal dimensions of that region.

The total amount of resources allocated to an MS of the group may be spread over multiple regions of the communication frame, hence that MS may be assigned a number of such regions. As previously mentioned, the region ID(s) corresponding to the allocated region(s) may be provided to the MSs during step S18 of method 50. If multiple regions are used, then the MSs may for example have to decode all Bitmap_Region_IE's in the broadcast MAP message to discover the ones having the same Region IDs as were assigned to them during the method 50 of FIG. 7, and thus to determine the physical location of the allocated regions. As already explained with reference to FIG. 9, this IE (Information Element) also identifies if reordering of user allocation is required within the region.

In step S24, the MS determines whether reordering as discussed above is required. This can be achieved by examining the information in the Bitmap_Region_IE, as can be seen from FIG. 9. Depending on whether or not reordering is required, method 60 takes one of two paths as shown in FIG. 8. Those two paths have a number of common method steps.

In step S26, the MSs of the group decode signalling information that describes the bursts contained within their respective allocated region(s), i.e. to discover what resources of the region(s) they have been allocated. This stage may for example involve the decoding of a message called a Bitmap_Allocation_IE.

FIGS. 10 and 11 are tables that provide details of two possible schemes for such a Bitmap_Allocation_IE, which schemes will be referred to as Options A (FIG. 10) and B (FIG. 11). As can be seen from FIGS. 10 and 11, those Bitmap_Allocation_IEs have a number of different sections, of which several are common between Options A and B.

Focussing first on the common sections between the Bitmap_Allocation_IEs for Options A and B, both have Allocation_bitmap, Resource_Allocation_bitmap, and Reorder_bitmap sections, each made up of varying numbers of bits as shown in FIGS. 10 and 11. The Allocation_bitmap section is effectively a bit string (being a type of bitmap), and the MS can use its assigned bit position to check that position in the string to see if it has been allocated resources in that region, as will become apparent later with reference to FIGS. 14 and 15. For Option A, the No. of Blocks section specifies the number of blocks within the burst concerned. This is not essential, but will provide the MS with the boundaries of each burst without having to compute them by means of a 2-bit accumulation of the Resource_Allocation_bitmap. The Resource_Allocation_ bitmap section is effectively another bit string, and the MS can use it's assigned bit position in combination with the Allocation_bitmap section to check its part of the string (assuming it has been allocated resources in the region) to locate its allocated resources in the region, again as will become apparent later with reference to FIGS. 14 and 15. The Reorder_bitmap is again a bit string, and the MS can (assuming that reordering is required) use it's assigned bit position in combination with the Allocation_bitmap section to check its part of the string (assuming it has been allocated resources in the region) to determine in which order the MSs for that region are allocated resources in the region. This will become apparent later with reference to FIG. 15.

The main difference between Option A and Option B, is that in Option A an MCS (Modulation and coding scheme) section is provided in the Bitmap_Allocation_IE to enable a different modulation and coding scheme to be specified per burst, whereas in Option B an MCS_bitmap section is provided in the Bitmap_Allocation_IE to enable a different modulation and coding scheme to be specified per MS using that region. Option A also provides a No_of_Bursts section specifying the number of bursts in the region, and a Boosting section to enable each burst to be boosted to a different level. This can be appreciated through a comparison of FIG. 10 with FIG. 11.

Because the MSs are in effect allocated one or more bursts each, Options A and B are therefore approximately equivalent to one another in that they each result in the MS knowing which burst and modulation coding scheme to use.

In the present example, therefore, a Bitmap_Allocation_IE is provided per region, each of which may be contained within the broadcast MAP message, for example concatenated with its corresponding Bitmap_Region_IE. As is now appreciated, such a Bitmap_Allocation_IE describes the resource allocation for each burst within the region using bitmap signalling. In the present embodiment, one Bitmap_Allocation_IE is used to describe all bursts within a region, where each burst can be assigned a particular modulation and coding scheme, however this is of course not essential. In the present embodiment, the Bitmap_Allocation_IEs (of Option A) also provide information on the number of blocks within each burst.

Figure 12:
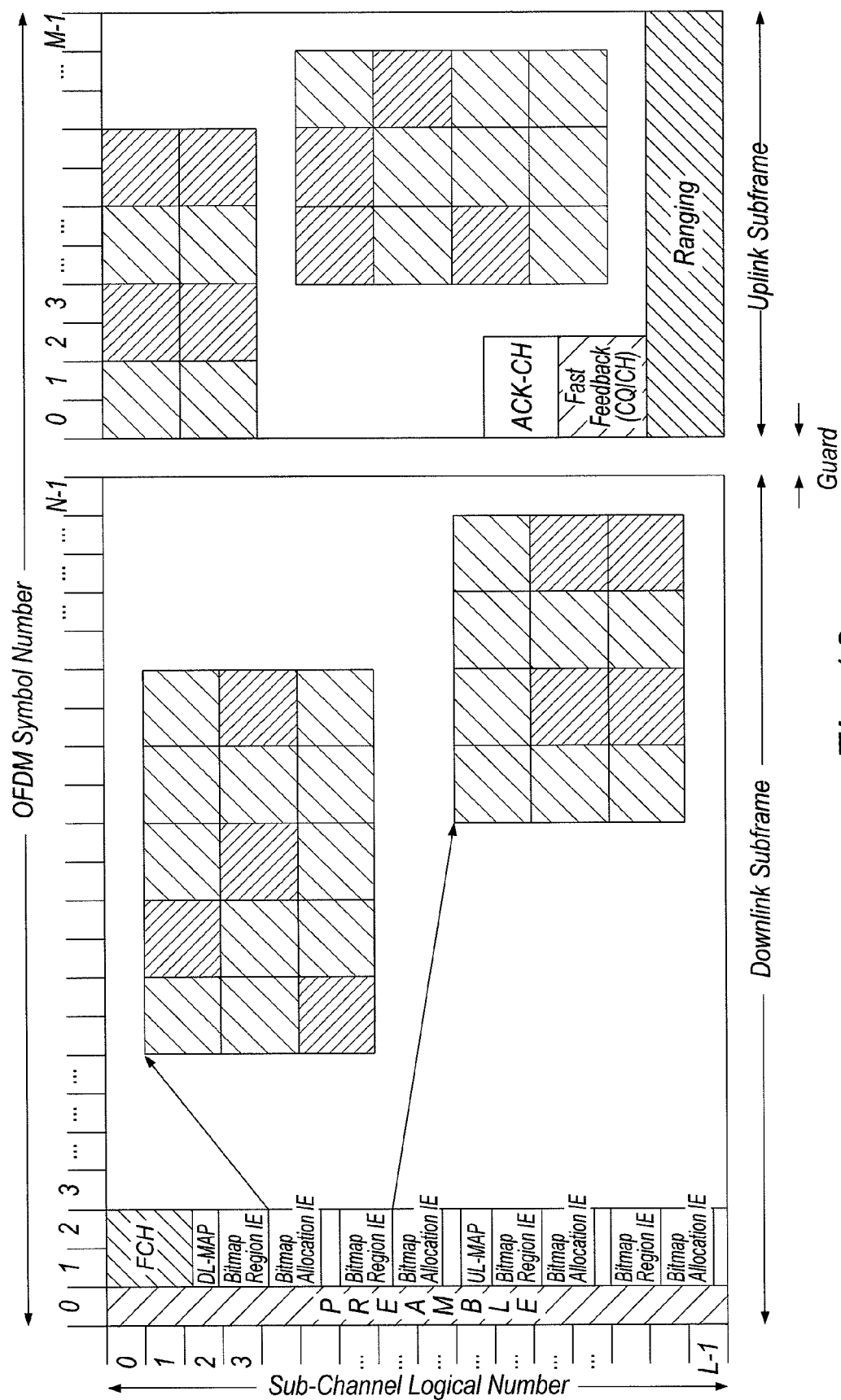
FIG. 12 is a schematic diagram of an OFDMA frame configured in accordance with an embodiment of the present invention.

FIG. 12 is a schematic diagram of an OFDMA frame configured in accordance with an embodiment of the present invention.

The OFDMA frame of FIG. 12 is shown split up into downlink and uplink subframes, and the downlink subframe is shown having the preamble followed by the Frame Control Header (FCH), the DL-MAP, and the UL-MAP. The DL- MAP is for allocation of resources in the downlink subframe, and the UL-MAP is for allocation of resources in the uplink subframe.

As can be seen from FIG. 12, pairs of concatenated IEs are provided in the DL-MAP and UL-MAP, each pair comprising a Bitmap_Region_IE and a Bitmap_Allocation_IE and corresponding to a particular region in the data area of the subframe concerned. In FIG. 12, two such pairs are schematically shown in the DL-MAP, relating to respective regions in the DL data area as indicated by arrows. Two such pairs are also shown in the UL-MAP, relating to respective regions in the UL data area. It will be appreciated that the Bitmap_Allocation_IEs may be Option A or Option B IEs, depending on desired communication properties. It will also be appreciated that the Bitmap_Region_IE and Bitmap_Allocation_IE pairs (constituting a first control scheme) may coexist in the DL and UL MAPs with DL and UL MAP_IEs (constituting a further control scheme) as shown in FIG. 5. Accordingly, the first control scheme of embodiments of the present invention (i.e. methods 50 and 60) may coexist in OFDMA frames with existing further control schemes. This is particularly advantageous from the point of view of backwards and forwards compatibility. In this way, a BS adapted to use such first and further control schemes can support communication with an MS also adapted to use such first and further control schemes, and also with an MS adapted to use only one of the first and further control schemes. Similarly, an MS adapted to use such first and further control schemes can communicate with a BS adapted to use only one of the first and further control schemes, or with a BS adapted to use both of the first and further control schemes.

Returning to FIG. 8, in step S28, using the Allocation_bitmap provided within the Bitmap_Allocation_IEs, the MS can determine if it has been allocated resources within any of the bursts within the region. This is achieved by using the bit position provided to the MS during the service setup procedure of method 70. If a '0' exists within that position then there is no allocation for that MS, but if a '1' exists then that MS has been allocated some resources within the burst described by the Bitmap_Allocation_IE where the user found its bitmap bit set to '1'.

As can be seen from FIG. 8, step S30 is carried out following step S28 if reordering is required. In step S30, the appropriate field (part) in the Reorder_bitmap is used by the MS to determine the start location of the resource allocated to it within region. The use of the Reorder_bitmap will become more apparent later with reference to FIG. 15. If no reordering is required, then step S30 is not carried out.

In step S32, the MS can then determine the amount of resource (number of blocks) it has been allocated within the region and the start point of its allocation by decoding the Resource_Allocation_bitmap.

In step S34, the MS can decode data within its part of the region using the information deduced from the various IEs.

As discussed above, the main difference between Option A and Option B is how the modulation and coding schemes are specified. In Option A the modulation and coding schemes are specified per burst, whereas in Option B the modulation and coding schemes are specified per connection. Therefore, for Option B an additional step (not shown in FIG. 8) is included in method 60 before step S32, which additional step will be referred to as step S31, in which the MS consults the MCS_bitmap section to determine the modulation and coding scheme applied to its allocation. For Option A, the modulation and coding schemes are specified per burst and this information is picked up for Option A in step S26.

With the example Bitmap_Allocation_IE's chosen for Option A and Option B, there is a trade-off between signal overhead and link adaptation efficiency. For instance, in Option B only 2 bits per user have been assigned to the MCS level as this will reduce overhead significantly. However, with Option A 4 bits have been assigned to MCS and 3 bits have been assigned to boosting, as these entities will provide more robustness in a wide range of link conditions. These link adaptation entities are considered to be implementation specific, and therefore particular arrangements disclosed herein are provided by way of example and should not be considered essential to the present invention.

Figure 13:
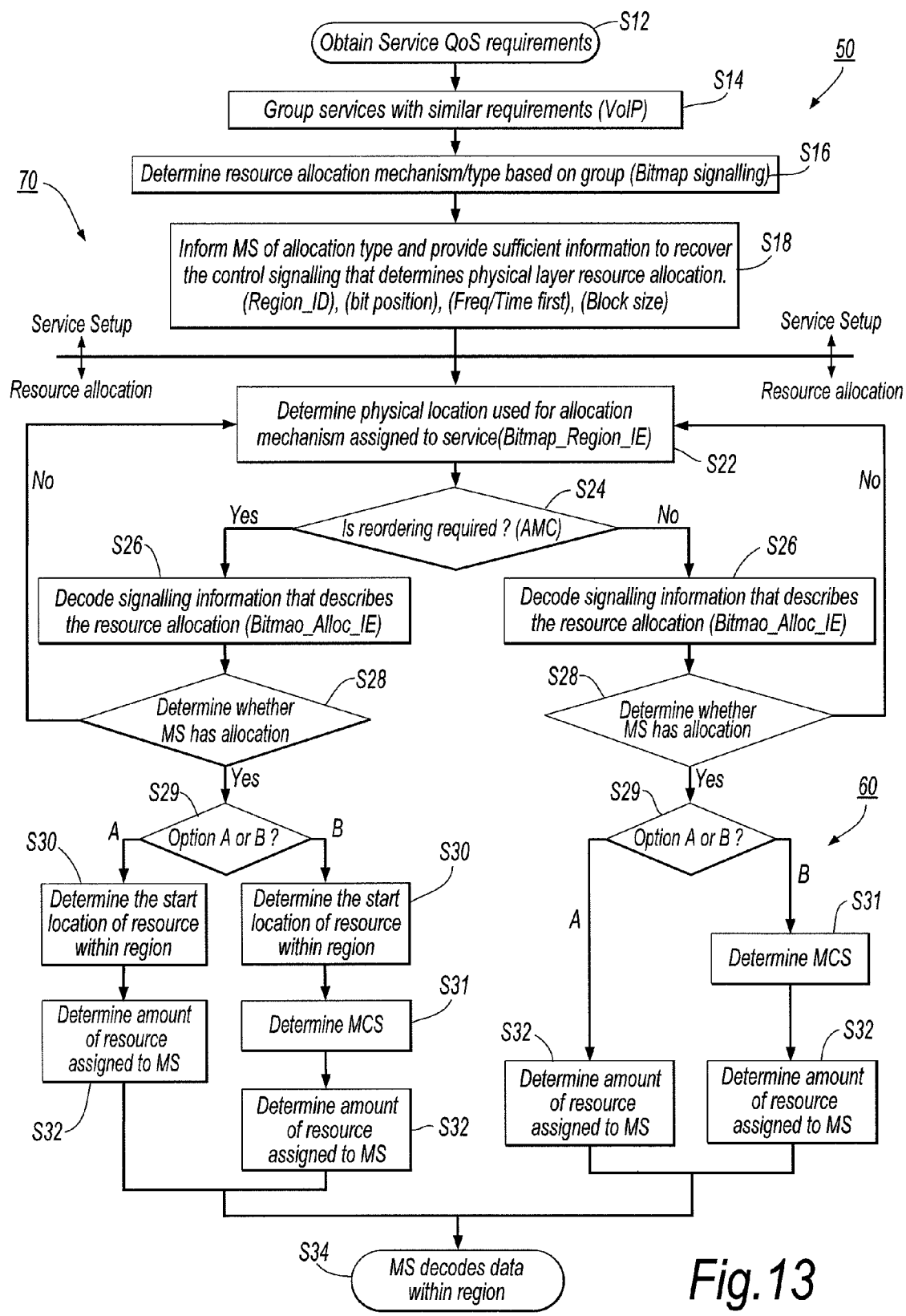
FIG. 13 is a flow diagram of a signalling method 70 embodying the present invention.
Figure 14:
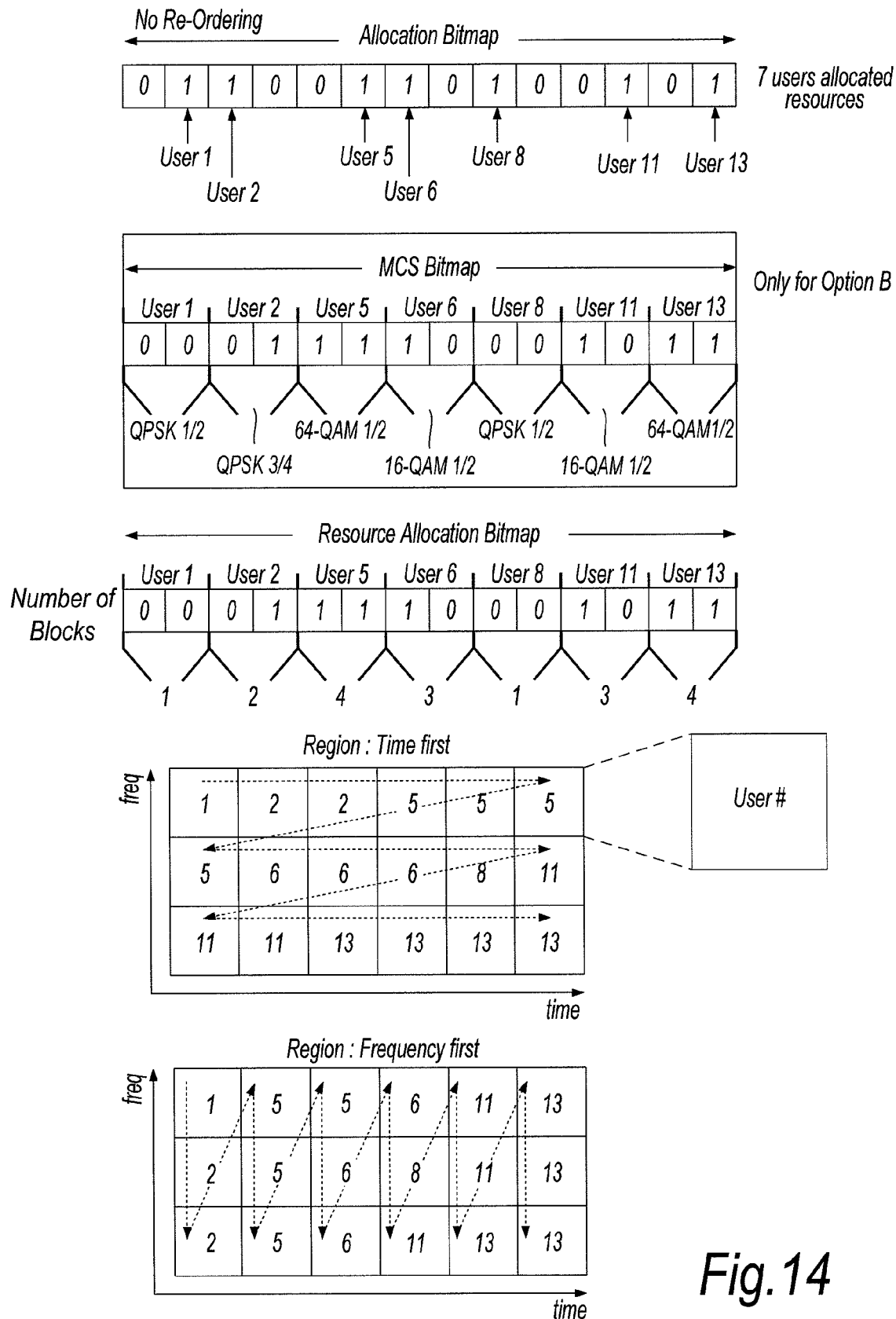
FIGS. 14 and 15 are examples of the bitmaps used in the bitmap signalling procedure when reordering is not used and when reordering is used, respectively.
Figure 15:
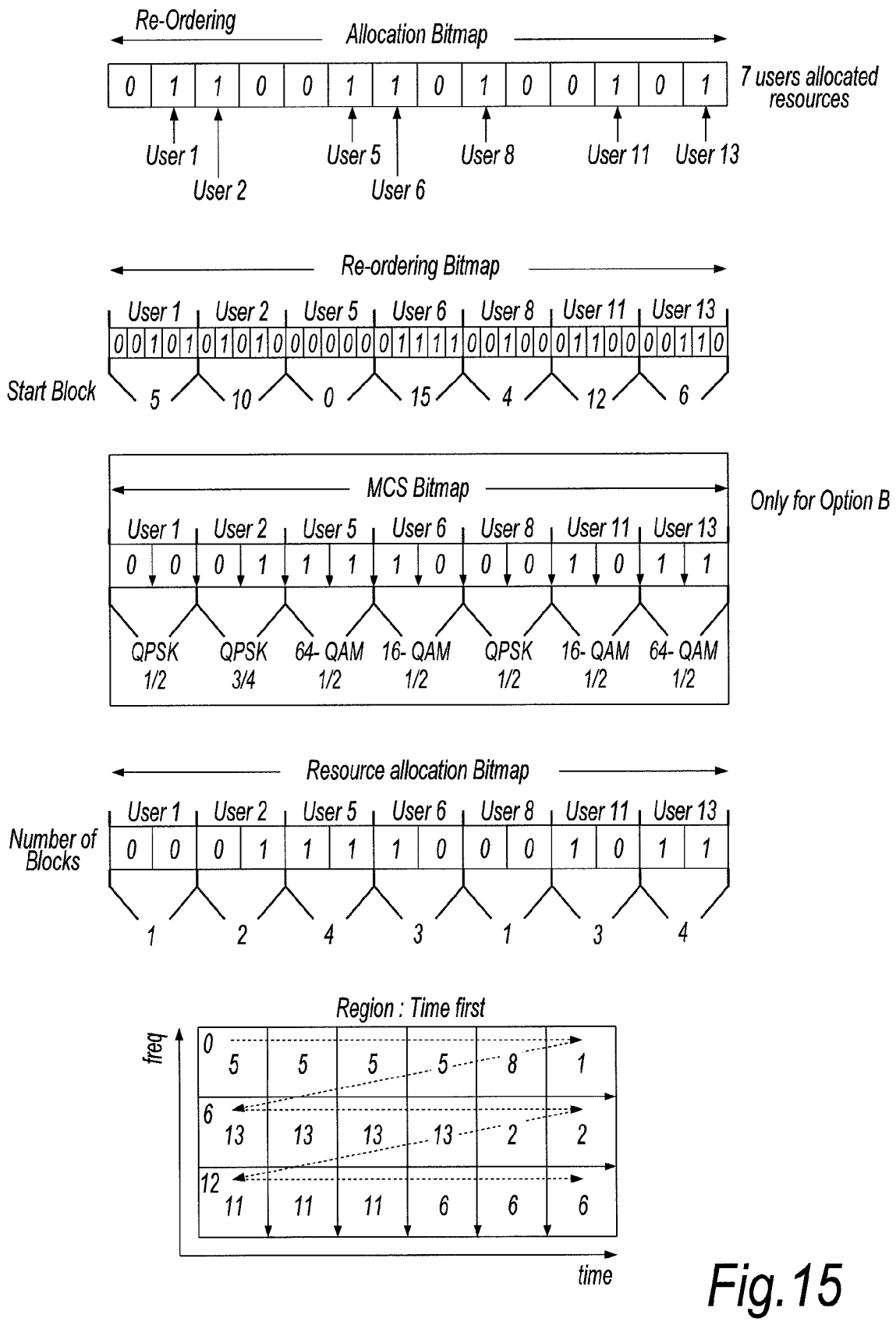

In order to better understand the present invention, an implementation example will now be considered with reference to FIGS. 13 to 15.

FIG. 13 is a flow diagram of a signalling method 70 embodying the present invention. As can be seen from FIG. 13, signalling method 70 effectively comprises methods 50 and 60 in combination. Method 60 is shown in method 70 including Options A and B as alternatives. Accordingly, method step S31 is explicitly shown before step S32 for Option B, and a step S29 is shown after step S28 for determining whether Option A or B should used.

The present implementation example considers that seven users (MSs) require a BS to allocate resources to support a VoIP application. The signalling method used involves two stages; the Service Setup Procedure (method 50) and the Resource Allocation Procedure (method 60). Operations within both stages, for both Option A and Option B are described below.

Through steps S12 and S14, the BS groups the MSs which have VoIP requirements (in this case, there are 14 MSs, 7 of which are active in the considered frame). The BS can then determine in step S16 which resource allocation type to use based on group requirements and available resources. In this case, the group has VoIP requirements, meaning that the bitmap signalling mechanism can be used as this will significantly reduce overhead. In step S18, the BS therefore informs the MSs of the selected allocation mechanism and provides sufficient information for the MSs to recover the control signalling that determines the physical resource allocation. Information provided to the MSs will include the following: Region_ID, Bit position in bitmap, Frequency/time-first for resource allocation, and the size of resource blocks within the region. The size of the resource block may be determined from the QoS requirements of the service. The resource block may be a set number of sub-carriers by a set number of OFDM symbols, i.e a set number of slots.

In step S22, the MSs use the Region_ID to recognise the corresponding Bitmap_Region_IE, and from thereon can determine the physical location of the region used for resource allocation and the transmission parameters used (e.g. time and freq offset, and if reordering is required). As before, the physical location of the bitmap region for VoIP will be contained within the Bitmap_Region_IE. The allocation may spread over multiple regions, however in this case only one region will be used. This IE also identifies if reordering of user allocation is required within the region. Without reordering, the users allocations are, in this example, sequential in either a time- or frequency-first manner based on step S18.

In step S26, the MS's then decode the signalling information that describes the resource allocation. This stage involves the decoding of the Bitmap_Allocation_IE for that region, which describes the resource allocation using bitmap signalling.

In step S28, using the Allocation_bitmap within the Bitmap_Allocation_IE, each MS can determine if it has been allocated resources within the region. This is achieved by using the bit position provided to the MS during step S18.

The MS determines from steps S22 and S24 if reordering is required, and by using the Reorder_bitmap decoded in step S26 the MS can determine in step S30 the start location (block number) of its resource within the region. If no reordering is required, then step S30 is of course skipped.

If Option B is chosen in step S29, then the MSs must decode the MCS bitmap in step S31 as this will provide sufficient information in order to demodulate and decode the data within the blocks. If Option A is used, then step S31 is skipped, the MCS information already having been assigned per burst as discussed above.

In step S32, each MS can then determine the amount of resource (number of blocks) it has been allocated within the region. This is achieved in this example by decoding the Resource_Allocaton bitmap. Finally, in step S34, the MSs can decode the data within their respective bursts by using the information provided in the previous operations.

In order to better understand the present implementation example, FIGS. 14 and 15 are examples of the bitmaps used in the bitmap signalling procedure when reordering is not used (FIG. 14) and when reordering is used (FIG. 15). In both cases, seven users have VoIP data within the considered frame but it is assumed that there are fourteen active MSs (users), named User 0 to User 13. This is typical of VoIP, in that a user will not be assigned resources in every scheduling interval (a frame or a series of frames).

Looking first at FIG. 14, it will be appreciated that it is not necessary to reorder MSs when they have medium to high mobility requirements. Reordering tends to be used to place an MS's allocation on a particular sub-channel (group of sub-carriers), usually when a time-first allocation is employed, whereas when an MS has medium to high mobility requirements it can be better to spread the allocation (by not applying reordering) to achieve both frequency and time diversity.

In FIG. 14, the uppermost bitmap is the Allocation Bitmap, which has fourteen bits, one each for Users 0 to 13. The seven MSs with data are shown as being Users 1, 2, 5, 6, 8, 11 and 13, their corresponding bit positions having a "1" as opposed to a "0".

When an MS receives its bit position during the service setup procedure, it can then use this value to determine if it has been assigned an allocation within this region. If the MS has been allocated a resource, then by decoding the Resource Allocation bitmap, shown as the lowermost bitmap in FIG. 14, it can determine the number of blocks allocated. It can be seen from FIG. 14 that the seven users with allocations are provided two bits each in order in the Resource Allocation bitmap. User 1, for example, has bits "00", indicating one allocated block, whereas User 5 has bits "11", indicating four allocated blocks.

In the case where the Option B Bitmap_Allocation_IE is used, then the MSs must also decode the MCS bitmap, shown as the middle bitmap in FIG. 14, as this will provide sufficient information for the MSs to demodulate and decode the blocks of data. It can be seen from FIG. 14 that the seven users with allocations are provided two bits each in order in the MCS bitmap. User 2, for example, has bits "01", indicating QPSK 3/4, whereas User 11 has bits "10", indicating 16-QAM 1/2.

Finally, by using the information provided during the service setup procedure (method 50), the MSs can determine whether a frequency- or time-first mapping is used within the region. Both possible mappings are shown as the bottom two parts of FIG. 14, with the User No. shown in each block of the region.

Turning now to FIG. 15, it will be appreciated that if MSs have low mobility requirements then frequency-selective scheduling may be desirable, in which case reordering of users is desirable. Frequency-selective scheduling is similar to AMC mode in legacy IEEE 802.16-2004 and IEEE 802.16e-2005 wireless communication systems.

FIG. 15 illustrates the same example where seven users are scheduled within one region as is used in FIG. 14, to enable ease of comparison. Accordingly, the Allocation Bitmap, the MCS Bitmap (for Option B), and the Resource Allocation Bitmap in FIG. 15 are the same as in FIG. 14.

In this case, if a particular MS has been allocated a resource, then by decoding the Re-ordering Bitmap it can determine the start position within the region for its allocation. As can be seen from FIG. 15, the Users have 5 bits each in the Re-ordering Bitmap in the order of their User number. User 8, for example, has bits "00100", indicating that its allocation starts in block 4. The result of the reordering can be seen from the time-first mapping at the bottom of FIG. 15. It will be appreciated that it is undesirable to use frequency-first mapping in this case, as the intention is to control which sub-carriers an MS is assigned to.

It will be appreciated that use of the Re-ordering Bitmap may render the Resource Allocation Bitmap redundant, as each MS can determine the number of blocks assigned to it from the Re-ordering Bitmap. For example, User 13 can determine that it's allocation starts at block 6 and that the next User's allocation starts at block 10. Therefore, User 13 can determine that it has been allocated 4 blocks. By omitting the Resource Allocation Bitmap, it will be appreciated that the signalling overhead can be reduced still further.

In order to appreciate the benefits of signalling methods according to embodiments of the present invention, FIG. 16 is a table for comparing the signalling overheads for the signalling mechanism used in the WiMAX 802.16e (IEEE 802.16e-2005) standard with a proposed signalling mechanism according to an embodiment of the present invention. The overhead has been calculated for 32 Users requiring resources and using Option B as the preferred approach.

From FIG. 16, it can be seen that 2040 DL signalling bits are required for the WiMAX 802.16e signalling mechanism, whereas for the example signalling mechanism embodying the present invention only 384 DL signalling bits without reordering, and 640 DL signalling bits with reordering, are required. By omitting the Resource Allocation Bitmap in the reordering case, it will be appreciated that the signalling overhead can be reduced still further to 576 bits.

Accordingly, in summary, the benefits of embodiments of the present invention are that: they define a protocol for signalling within a wireless communication system which can coexist with existing protocols; they minimise control signalling overhead within the physical layer by exploiting the properties of particular types of service flow (i.e. periodic/deterministic allocation); they are very well suited to constant, or near constant, bit-rate applications such as VoIP and consequently enable significant increase in VoIP capacity as opposed to using existing signalling mechanisms; they minimise impact on existing legacy designs (i.e. they can coexist with legacy designs) as the number of modifications required are minimal and legacy devices that are unaware of the signalling mechanism can coexist in the same system with those that are aware; and they can be used for service types other than VoIP where there is room to exploit deterministic properties of the service, and in systems other than OFDM/OFDMA systems, still achieving the above benefits.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A signaling method for use in a multiple-access communication system, the system comprising a first communication apparatus and a plurality of second communication apparatuses, the second communication apparatuses being operable to communicate with the first communication apparatus using respective parts of a shared communication frame and each using an available service level for such communication, the method comprising:
   assessing service-level requests from the second communication apparatuses to determine if there is a group of the second communication apparatuses that have VoIP service-level requirements;
   if it is determined that such a VoIP group exists, employing a first control scheme specifying communication control information for the second communication apparatuses of the VoIP group to be transmitted in each downlink subframe of the shared communication frame; and
   for any second communication apparatus not part of the VoIP group, employing a further control scheme different from said first control scheme, the further control scheme specifying communication control information for that second communication apparatus, to be transmitted in each downlink subframe of the shared communication frame using a 2D allocation scheme specifying subchannel offset and symbol offset of allocated resource for that second communication apparatus, and individual control information for use by that second communication apparatus,
   wherein the communication control information of the first control scheme is a bitmap signaling mechanism with combined control information for use by all the second communication apparatuses of the VoIP group, the first control scheme employing fewer communication control parameters than the communication control information of the further control scheme, such that use of the first control scheme for said VoIP group of second communication apparatuses enables communication for more such second communication apparatuses to be supported in said shared communication frame than if such a further control scheme were used for said VoIP group of second communication apparatuses.

2. A signaling method as claimed in claim 1, wherein at least a predetermined number of said second communication apparatuses are needed to form such a VoIP group.

3. A signaling method as claimed in claim 1, wherein said service-level requirements include quality-of-service requirements.

4. A signaling method as claimed in claim 1, wherein it is determined that such a VoIP group exists if the second communication apparatuses concerned have a number of identical VoIP service-level requirements.

5. A signaling method as claimed in claim 1, wherein use of the first control scheme indicates that a number of communication control parameters have predetermined values, and wherein the control information of the first control scheme does not include values for those communication control parameters.

6. A signaling method as claimed in claim 1, wherein the control information of the first control scheme is formulated in a reduced format compared to the control information of the or each further control scheme.

7. A signaling method as claimed in claim 1, further comprising, as part of the first control scheme, informing the second communication apparatuses of the VoIP group of the location of their respective parts of the control information in the bitmap.

8. A signaling method as claimed in claim 1, wherein the shared communication frame is configured to have a control area, the method comprising using the control area for transmission of the control information of the first control scheme and control information of the or each further control scheme.

9. A signaling method as claimed in claim 1, wherein the shared communication frame is configured to have a data area, the method comprising, as part of the first control scheme, allocating resources in a region of the data area to the second communication apparatuses of the VoIP group and including in the control information of the first control scheme information identifying the allocated resources for each second communication apparatus of the VoIP group.

10. A signaling method as claimed in claim 1, comprising, as part of the first control scheme, selecting based on the service-level requests of the VoIP group a number of minimum resource allocation units of the shared communication frame to form a combined resource allocation unit and allocating resources of the shared communication frame to the second communication apparatuses of the VoIP group in combined resource allocation units.

11. A signaling method as claimed in claim 1, comprising: determining for at least one of the second communication apparatuses whether it is compatible with said first control scheme; and for any second communication apparatus determined to be not compatible with said first control scheme, designating that second communication apparatus as not capable of being part of said VoIP group and employing said further control scheme for that second communication apparatus.

12. The signaling method as claimed in claim 1, wherein said system is an OFDM or OFDMA system, and wherein the shared communication frame is an OFDM or OFDMA time-division-duplex frame or a downlink or uplink sub-frame thereof.

13. The signaling method as claimed in claim 1, wherein the or each first communication apparatus is a base station or a relay station.

14. The signaling method as claimed in claim 1, wherein the or each second communication apparatus is a mobile station or a relay station.

15. A multiple-access communication system, comprising:
   a first communication apparatus;
   a plurality of second communication apparatuses operable to communicate with the first communication apparatus using respective parts of a shared communication frame and each using an available service level for such communication;
   assessing means operable to assess service-level requests from the second communication apparatuses to determine if there is a group of the second communication apparatuses that have VoIP service-level requirements;

first control means operable, if it is determined that such a VoIP group exists, to employ a first control scheme specifying communication control information for the second communication apparatuses of the VoIP group to be transmitted in each downlink subframe of the shared communication frame; and second control means operable, for any second communication apparatus not part of the VoIP group, to employ a further control scheme different from said first control scheme, the further control scheme specifying communication control information for that second communication apparatus to be transmitted in each downlink subframe of the shared communication frame using a 2D allocation scheme specifying subchannel offset and symbol offset of allocated resource for that second communication apparatus, and individual control information for use by that second communication apparatus, wherein the communication control information of the first control scheme is a bitmap signaling mechanism with combined control information for use by all the second communication apparatuses of the VoIP group, the first control scheme employing fewer communication control parameters than the communication control information of the further control scheme, such that use of the first control scheme for said VoIP group of second communication apparatuses enables communication for more such second communication apparatuses to be supported in said shared communication frame than if such a further control scheme were used for said VoIP group of second communication apparatuses.

16. A communication apparatus having a processor for executing a computer program for use in a multiple-access communication system, the system further comprising a plurality of further communication apparatuses operable to communicate with the claimed communication apparatus using respective parts of a shared communication frame and each using an available service level for such communication, the computer program comprising instructions for the communication apparatus to execute:

assessing module operable to assess service-level requests from the further communication apparatuses to determine if there is a group of the further communication apparatuses that have VoIP service-level requirements;

first control module, operable, if it is determined that such a VoIP group exists, to employ a first control scheme specifying communication control information for the further communication apparatuses of the VoIP group to be transmitted in each downlink subframe of the shared communication frame; and second control module operable, for any further communication apparatus not part of the VoIP group, to employ a further control scheme different from said first control scheme, the further control scheme specifying communication control information for that further communication apparatus to be transmitted in each downlink subframe of the shared communication frame using a 2D allocation scheme specifying subchannel offset and symbol offset of allocated resource for that second communication apparatus, and individual control information for use by that second communication apparatus, wherein the communication control information of the first control scheme is a bitmap signaling mechanism with combined control information for use by all the second communication apparatuses of the VoIP group, the first control scheme employing fewer communication control parameters than the communication control information of the further control scheme, such that use of the first control scheme for said VoIP group of further communication apparatuses enables communication for more such further communication apparatuses to be supported in said shared communication frame than if such a further control scheme were used for said VoIP group of further communication apparatuses.

17. A computer program stored in a non-transitory computer readable medium which, when executed on a computing device of a multiple-access communication system, the system comprising a first communication apparatus and a plurality of second communication apparatuses, the second communication apparatuses being operable to communicate with the first communication apparatus using respective parts of a shared communication frame and each using an available service level for such communication, the computer program causing the computing device to execute a signaling method comprising:

assessing service-level requests from the second communication apparatuses to determine if there is a group of the second communication apparatuses that have VoIP service-level requirements;

if it is determined that such a VoIP group exists, employing a first control scheme specifying communication control information for the second communication apparatuses of the VoIP group to be transmitted in each downlink subframe of the shared communication frame; and for any second communication apparatus not part of the VoIP group, employing a further control scheme different from said first control scheme, the further control scheme specifying communication control information for that second communication apparatus, to be transmitted in each downlink subframe of the shared communication frame using a 2D allocation scheme specifying subchannel offset and symbol offset of allocated resource for that second communication apparatus, and individual control information for use by that second communication apparatus, wherein the communication control information of the first control scheme is a bitmap signaling mechanism with combined control information for use by all the second communication apparatuses of the VoIP group, the first control scheme employing fewer communication control parameters than the communication control information of the further control scheme, such that use of the first control scheme for said VoIP group of second communication apparatuses enables communication for more such second communication apparatuses to be supported in said shared communication frame than if such a further control scheme were used for said VoIP group of second communication apparatuses.

18. A computer program stored in a non-transitory computer readable medium which, when executed on a computing device of a first communication apparatus of a multiple-access communication system, the system further comprising a plurality of second communication apparatuses operable to communicate with the first communication apparatus using respective parts of a shared communication frame and each using an available service level for such communication, the computer program causing the computing device to execute a signaling method comprising:

assessing service-level requests from the second communication apparatuses to determine if there is a group of the second communication apparatuses that have VoIP service-level requirements;

if it is determined that such a VoIP group exists, employing a first control scheme specifying communication control information for the second communication apparatuses of the group to be transmitted in each downlink subframe of the shared communication frame; and for any second communication apparatus not part of the VoIP group, employing a further control scheme different from said first control scheme, the further control scheme specifying communication control information for that second communication apparatus, to be transmitted in each downlink subframe of the shared communication frame using a 2D allocation scheme specifying subchannel offset and symbol offset of allocated resource for that second communication apparatus, and individual control information for use by that second communication apparatus, wherein the communication control information of the first control scheme is a bitmap signaling mechanism with combined control information for use by all the second communication apparatuses of the VoIP group, the first control scheme employing fewer communication control parameters than the communication control information of the further control scheme, such that use of the first control scheme for said VoIP group of second communication apparatuses enables communication for more such second communication apparatuses to be supported in said shared communication frame than if such a further control scheme were used for said VoIP group of second communication apparatuses.

19. A multiple-access communication system, comprising:

a first communication apparatus;

a plurality of second communication apparatuses operable to communicate with the first communication apparatus using respective parts of a shared communication frame and each using an available service level for such communication;

an assessor operable to assess service-level requests from the second communication apparatuses to determine if there is a group of the second communication apparatuses that have VoIP service-level requirements;

a first controller operable, if it is determined that such a VoIP group exists, to employ a first control scheme specifying communication control information for the second communication apparatuses of the VoIP group to be transmitted in each downlink subframe of the shared communication frame; and a second controller operable, for any second communication apparatus not part of the VoIP group, to employ a further control scheme different from said first control scheme, the further control scheme specifying communication control information for that second communication apparatus to be transmitted in each downlink subframe of the shared communication frame using a 2D allocation scheme specifying subchannel offset and symbol offset of allocated resource for that second communication apparatus, and individual control information for use by that second communication apparatus, wherein the communication control information of the first control scheme is a bitmap signaling mechanism with combined control information for use by all the second communication apparatuses of the VoIP group, the first control scheme employing fewer communication control parameters than the communication control information of the further control scheme, such that use of the first control scheme for said VoIP group of second communication apparatuses enables communication for more such second communication apparatuses to be supported in said shared communication frame than if such a further control scheme were used for said VoIP group of second communication apparatuses.

20. A communication apparatus for use in a multiple-access communication system, the system further comprising a plurality of further communication apparatuses operable to communicate with the claimed communication apparatus using respective parts of a shared communication frame and each using an available service level for such communication, the claimed communication apparatus comprising:

an assessor operable to assess service-level requests from the further communication apparatuses to determine if there is a group of the further communication apparatuses that have VoIP service-level requirements;

a first controller operable, if it is determined that such a VoIP group exists, to employ a first control scheme specifying communication control information for the further communication apparatuses of the VoIP group to be transmitted in each downlink subframe of the shared communication frame; and a second controller operable, for any further communication apparatus not part of the VoIP group, to employ a further control scheme different from said first control scheme, the further control scheme specifying communication control information for that further communication apparatus to be transmitted in each downlink subframe of the shared communication frame using a 2D allocation scheme specifying subchannel offset and symbol offset of allocated resource for that second communication apparatus, and individual control information for use by that second communication apparatus, wherein the communication control information of the first control scheme is a bitmap signaling mechanism with combined control information for use by all the second communication apparatuses of the VoIP group, the first control scheme employing fewer communication control parameters than the communication control information of the further control scheme, such that use of the first control scheme for said VoIP group of further communication apparatuses enables communication for more such further communication apparatuses to be supported in said shared communication frame than if such a further control scheme were used for said VoIP group of further communication apparatuses.

* * * * *